United States Patent
Hagai et al.

[19]

[11] Patent Number: 6,167,059
[45] Date of Patent: Dec. 26, 2000

[54] APPARATUS AND METHOD FOR TRANSMITTING DATA

[75] Inventors: Avi Hagai, Raanana; Ronen Amrani, Givataim; Eliezer Weitz, Hulon; Yoram Yeivin, Hod Hasharon, all of Israel

[73] Assignee: Motorola Inc., Schaumburg, Ill.

[21] Appl. No.: 09/013,048

[22] Filed: Jan. 26, 1998

[51] Int. Cl.[7] .......................... H04L 12/28; H04L 12/56; H04L 12/54

[52] U.S. Cl. ...................... 370/456; 370/395; 370/398; 370/412; 370/428

[58] Field of Search ................................. 370/412, 413, 370/414, 417, 418, 428, 429, 395, 398, 389, 392, 396, 397

[56] References Cited

U.S. PATENT DOCUMENTS

| | | | |
|---|---|---|---|
| 4,930,121 | 5/1990 | Shiobara . | |
| 5,119,374 | 6/1992 | Firoozmand et al. . | |
| 5,278,828 | 1/1994 | Chao | 370/395 |
| 5,381,413 | 1/1995 | Tobagi et al. . | |
| 5,485,456 | 1/1996 | Shtayer et al. . | |
| 5,491,691 | 2/1996 | Shtayer et al. . | |
| 5,535,202 | 7/1996 | Kondoh . | |
| 5,734,650 | 3/1998 | Hayter et al. | 370/391 |
| 5,812,550 | 9/1998 | Sohn et al. | 370/395 |
| 5,848,068 | 12/1998 | Daniel et al. | 370/395 |
| 5,875,189 | 2/1999 | Brownhill et al. | 370/395 |
| 5,889,779 | 3/1999 | Lincoln | 370/398 |
| 5,936,958 | 8/1999 | Soumiya et al. | 370/395 |

OTHER PUBLICATIONS

"Comparative Evaluation of Band Management Systems Considering Multichannels in ATM Networks" by Ken–ichi Baba, T. Saito, M. Murata and H. Miyahara, Electronics and Communications in Japan, Part 1, vol. 77, No. 3, 1994, pp. 15–24.

"ATM AAL–2 Chip Design for Video Applications over ATM Network" by Yuan–Sun Chu Ching–Lung Chang, Lian–Jyi Lin and Kim–Joan Chen, Department of Electrical Engineering, supported by National Science council under grant No. NSC83–0404–194–015 and NSC84–2213–E–194–027, pp. 1049–1052.

*Primary Examiner*—Huy D. Vu
*Assistant Examiner*—M. Phan

[57] ABSTRACT

A communication system (100) comprises a processor (150), a channel memory (160), a communication line (180), a transmit connect table (146), a transmit scheduler table (144), and a program memory (148). The channel memory (160) stores channels (161) with data cells (102). The processor (150) writes channel identifiers (e.g., ①②) into schedule fields (110-V) of the transmit scheduler table (144) and points with a pointer R and a pointer V to the schedule fields (110-V). The pointers R and V identify fields in which the processor (150) looks up for a first channel identifier. The processor (150) forwards data cells (102) from the channel memory (160) to the communication line (180) for the channel (161) corresponding to the first channel identifiers. Then, the processor (150) moves the first channel identifier to an other field and writes a second channel identifier stored in the transmit connect table (146) to the field of the first channel identifier.

15 Claims, 11 Drawing Sheets

200

200

EXAMPLE (A)

APPARATUS AND METHOD FOR TRANSMITTING DATA

FIELD OF THE INVENTION

The present invention in general relates to apparatus and method for transferring data, especially to scheduling the transmission of information packages or cells by channels in Asynchronous Transfer Mode (ATM).

BACKGROUND OF THE INVENTION

In today's telecommunications, digital networks transport large amounts of information. Network services can be, for example, traditional voice phone, facsimile, television, audio and video broadcast, and data transfer. The general public knows new services by catchwords, such as, for example, internet, intranet, teleconferencing, digital television, telebanking, teleshopping, point of sale, ISDN, to name only a few.

Asynchronous Transfer Mode (ATM) has been accepted universally as the transfer mode of choice for Broadband Integrated Services Digital Networks (B-ISDN). Today, ATM-networks are available with a capacity of 155 Mbps (Megabit per second). With the increasing need of information exchange in the global society, the capacity of existing and future networks must be used efficiently. Multiplexers switch different network services to a single network in a such a way that every service is fully maintained and does not disturb other services.

Useful references describing ATM are [1] Clark, Martin P., "ATM Networks, Principles and Use", John Wiley & Sons and also B. G. Teubner Publishers, New York 1996. ISBN 0 471 96701 7; and [2] Onvural, Raif O., Asynchronous Transfer Mode Networks, Performance Issues, 2nd Rev. ed. ISBN 0-89006-804-6, Artech House, Boston, London 1995.

Every kind of service transmitted by ATM-networks has its own requirements, such as, e.g., capacity (bit rate in bit per second, bps) and priority. For example, two persons talk on the phone and exchange at the same time high definition color images between their computers. Both services, the phone service (at e.g., 64 kbps) and the data service (e.g. 1 Megabyte in total), use the same ATM-network. When speaking, the persons will not understand each other when the phone service has a delay of≈10 milliseconds or more. They will not recognize a delay of the same magnitude for the data service. The multiplexer periodically switches the phone service to the network so that delays are minimized. The multiplexer switches the data service to the network when the phone service does not require the network. In other words, the phone service has a high priority, and a relatively low bit rate. The data transfer service has a lower priority.

In an ATM multiplexer or switch, data originating from different kind of services (or "channels") is segmented into information packages or so-called cells. Cells are the basic information transfer unit in ATM networks. As used herein, a cell is a fixed number (e.g. 53) of bytes with information to be transmitted ("payload") and control information ("header"). A typical cell structure is described in section 2 of [2].

Scheduling methods play a critical role in the design of ATM multiplexers. The present invention seeks to provide an apparatus and method for transmitting cells in ATM, which allows efficient use of the network.

BRIEF DESCRIPTION OF THE DRAWINGS

FIGS. 2 and 3 are simplified state-time diagrams illustrating by way of examples how the communication system of FIG. 1 transmits cells, wherein FIG. 2 shows a first example and FIG. 3 shows a second example;

DETAILED DESCRIPTION OF THE PREFERRED EMBODIMENT

A system and a method of the present invention multiplex ATM-channels to, preferably, a single communication line. The channels can provide ATM-cells at different traffic parameters, such as, for example, different cell or bit rates, priorities, and bursts. The system schedules channels in a first table by channels identifiers. Cyclical pointers to this first table advance (i) at every time slot, and (ii) within a time slot. Thereby, the pointers scan the first table. If the system identifies a channel then it reads traffic parameters of that channel from a second table and couples that channels to the communication line. The system updates the first table by re-scheduling the next data transmission according to the traffic parameters for later time slots. The entries of the current time slot are obtained from a link field of the second table.

The present invention transmits cells from channels having different cell rates (e.g., cells per time slot) and different priorities (e.g., high, medium, low) to the network which has, usually, a constant cell rate, without interference between the channels and without losing any information.

Figure 1:
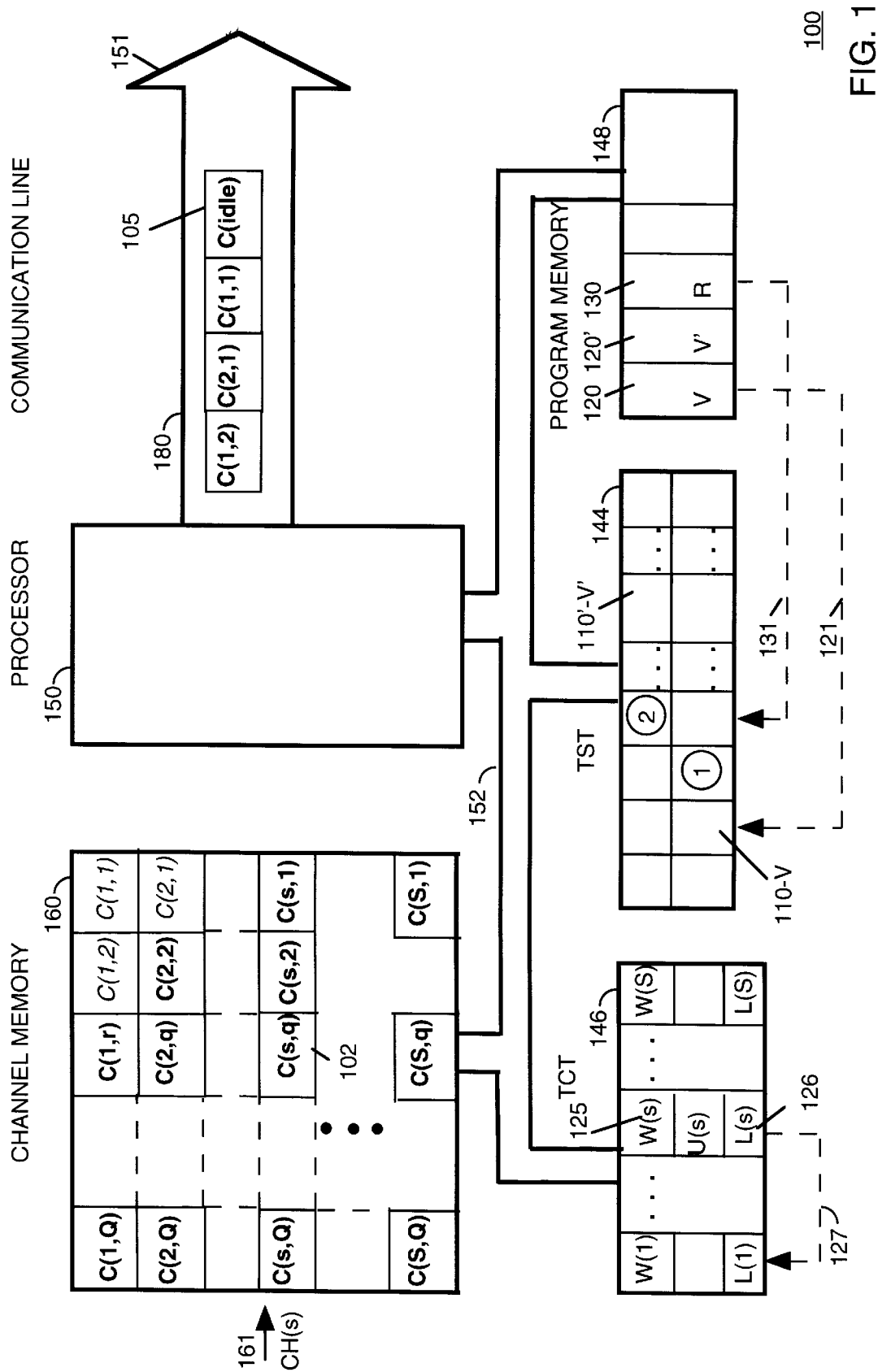
FIG. 1 is a simplified block diagram of a communication system according to a preferred embodiment of the present invention.
Figure 2:
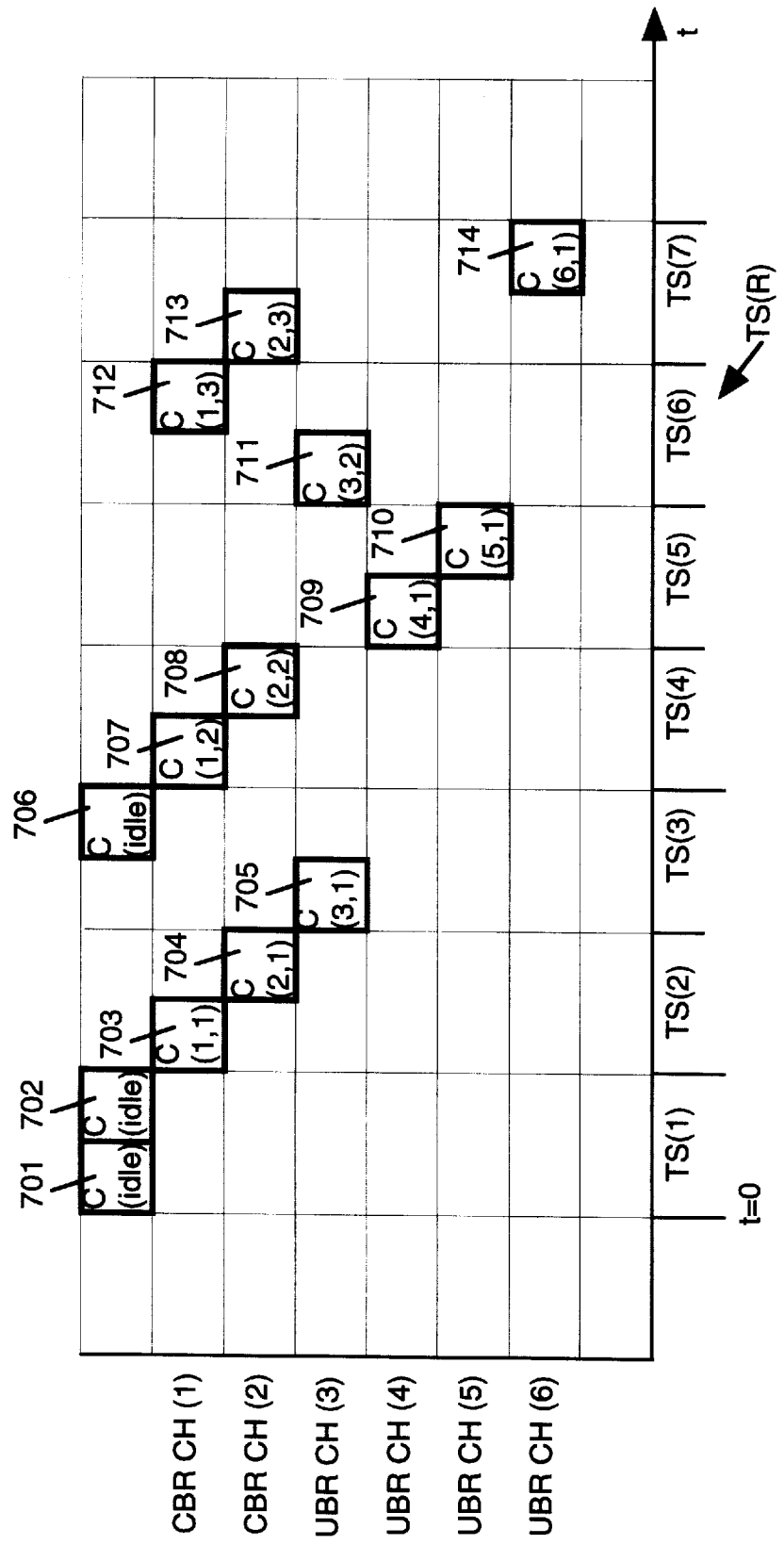
Figure 3:
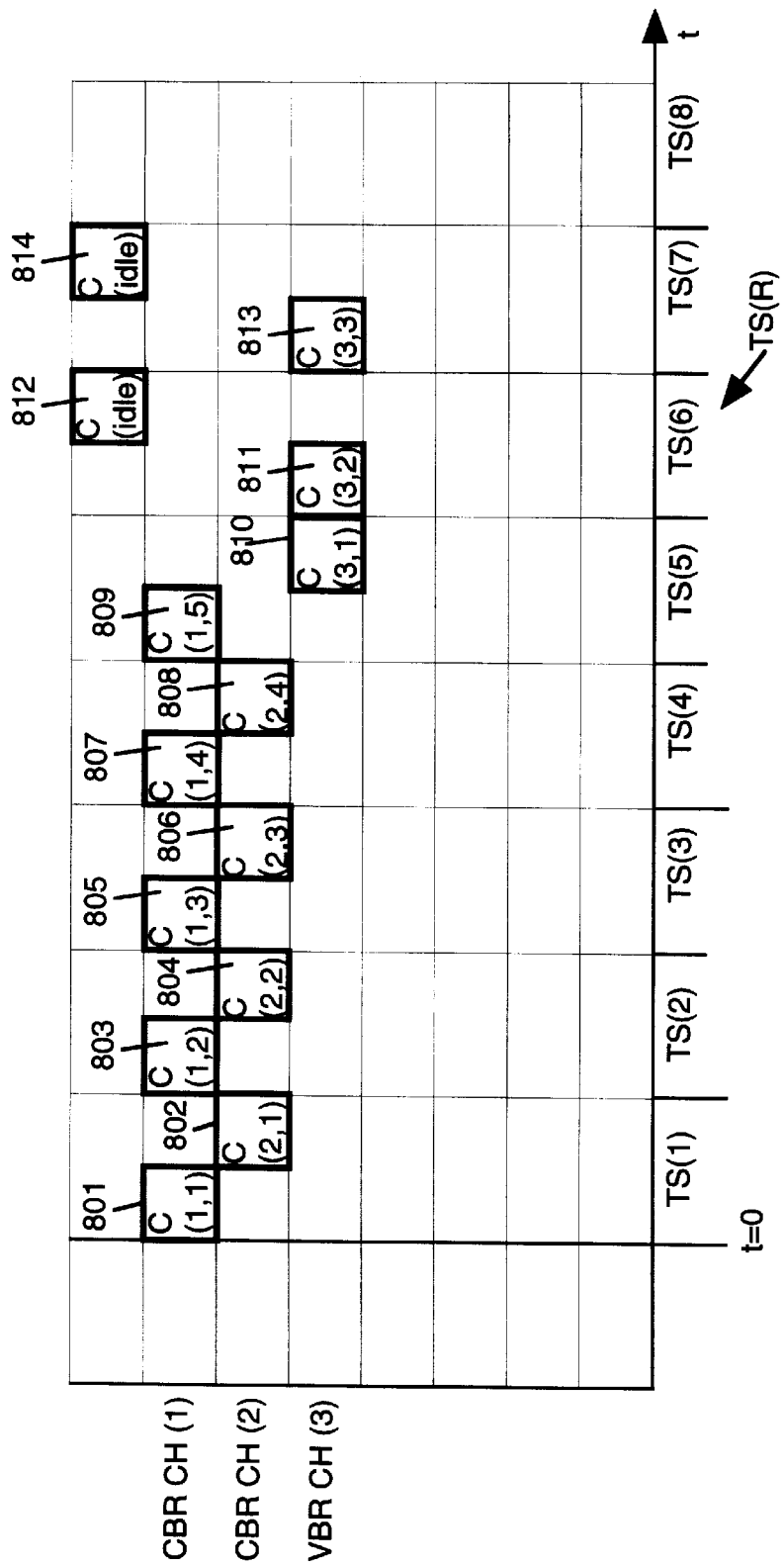
Figure 4:
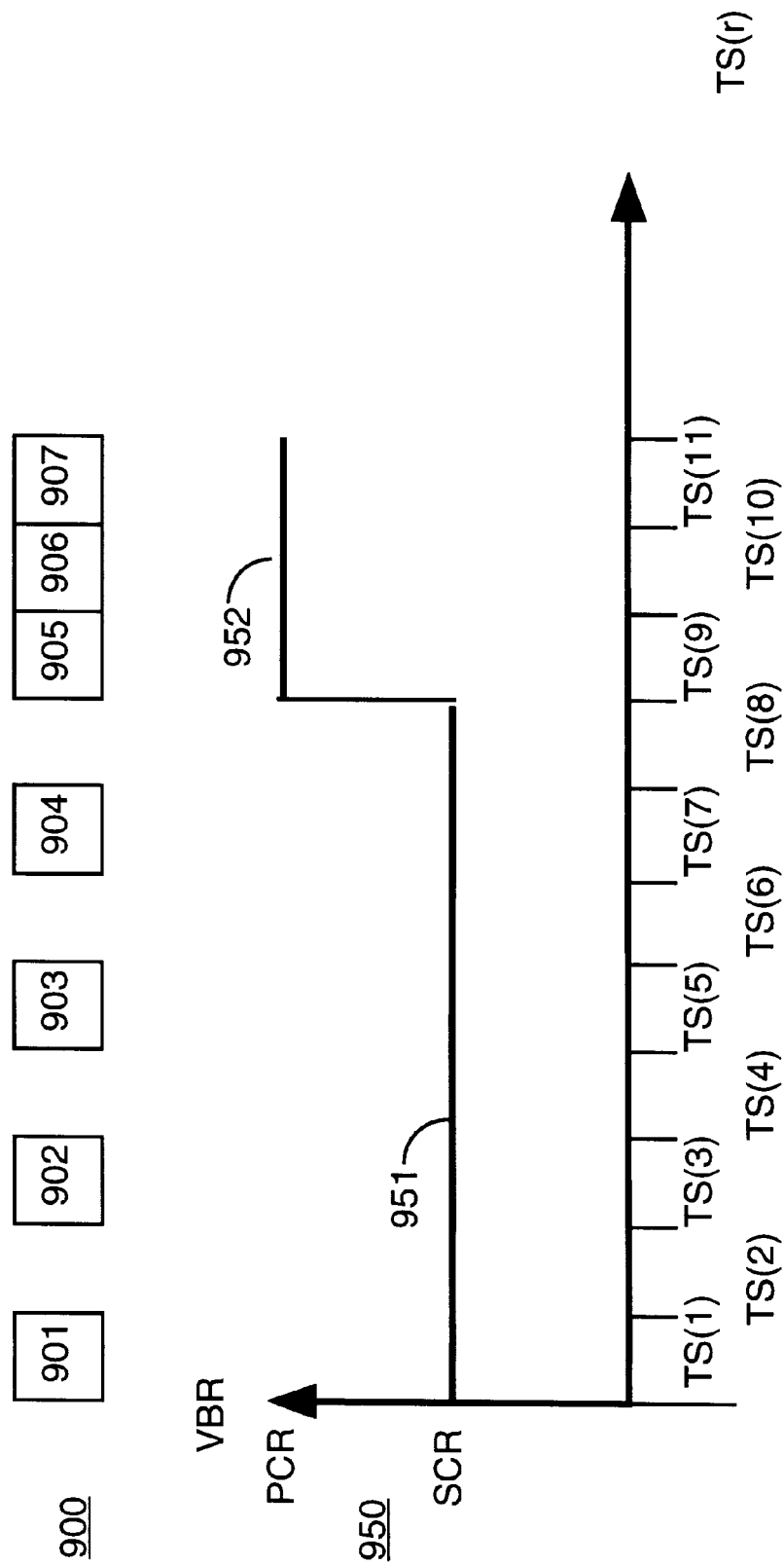
FIG. 4 is simplified rate-time diagram for illustrating a variable bit rate of transmitting cells from a VBR-channel.
Figure 6:
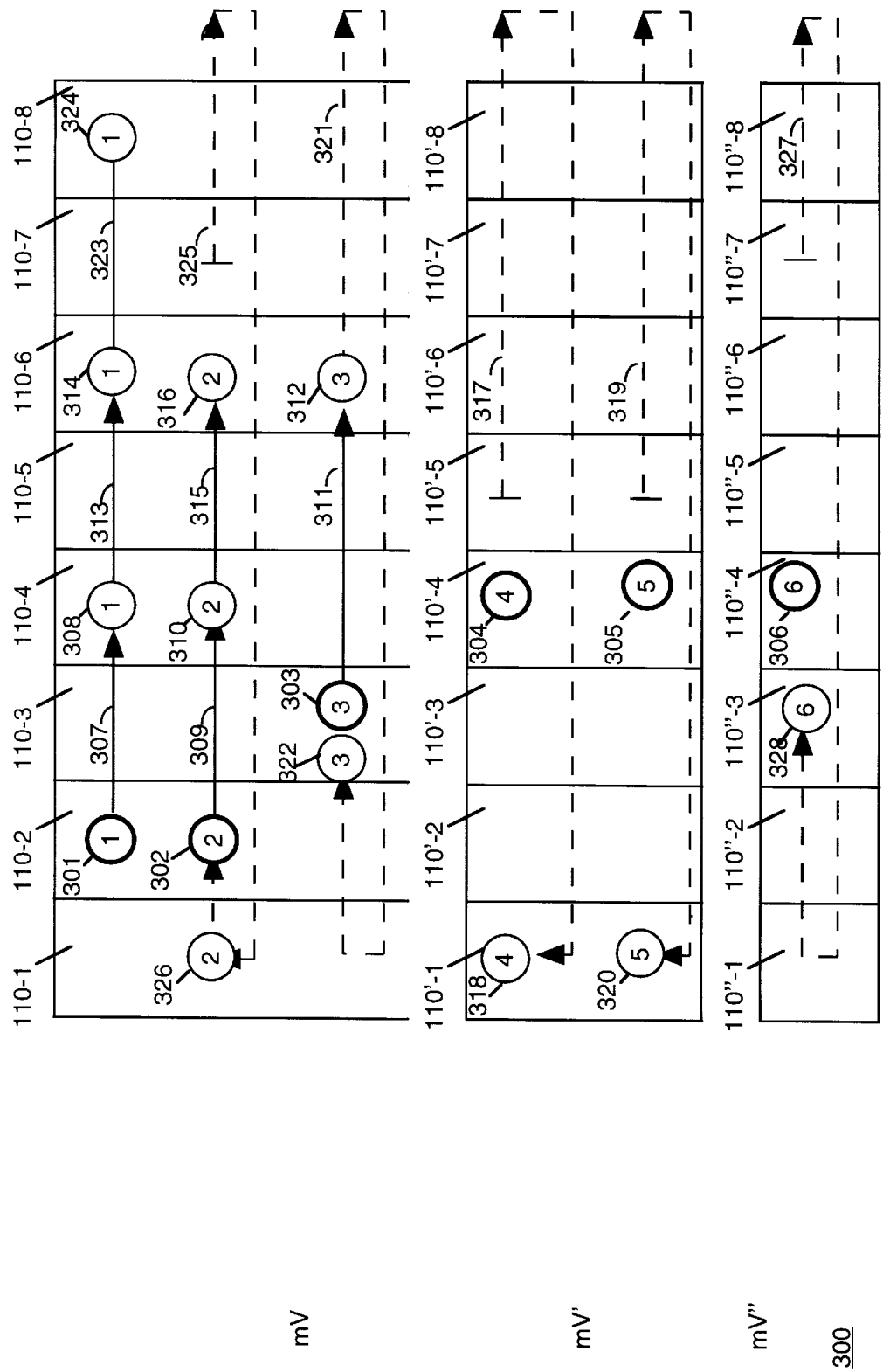
FIG. 6 illustrates schedule fields of a table in the system of FIG. 1 for the first example.
Figure 7:
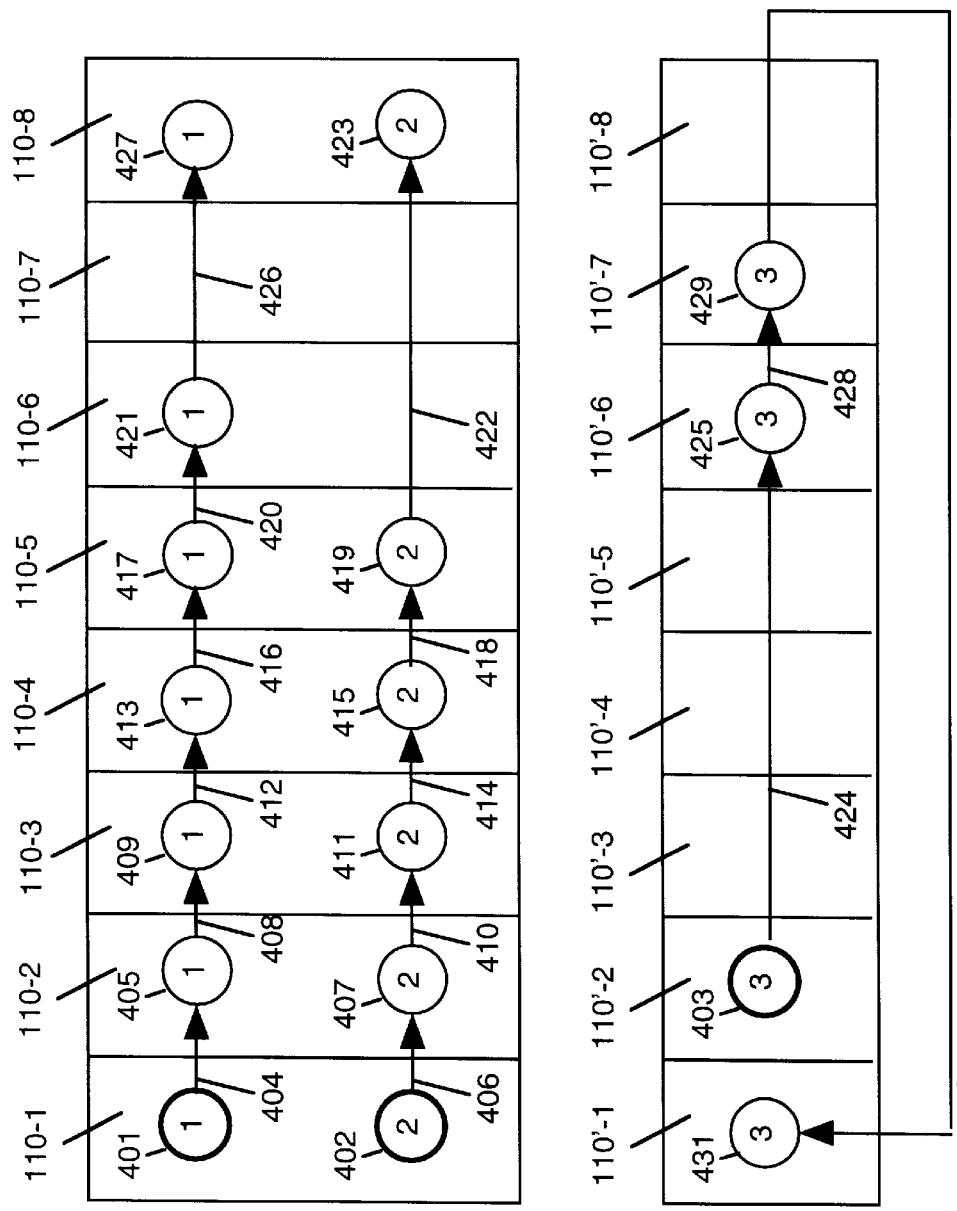
FIG. 7 illustrates schedule fields of the table in the system of FIG. 1 for the second example.
Figure 8:
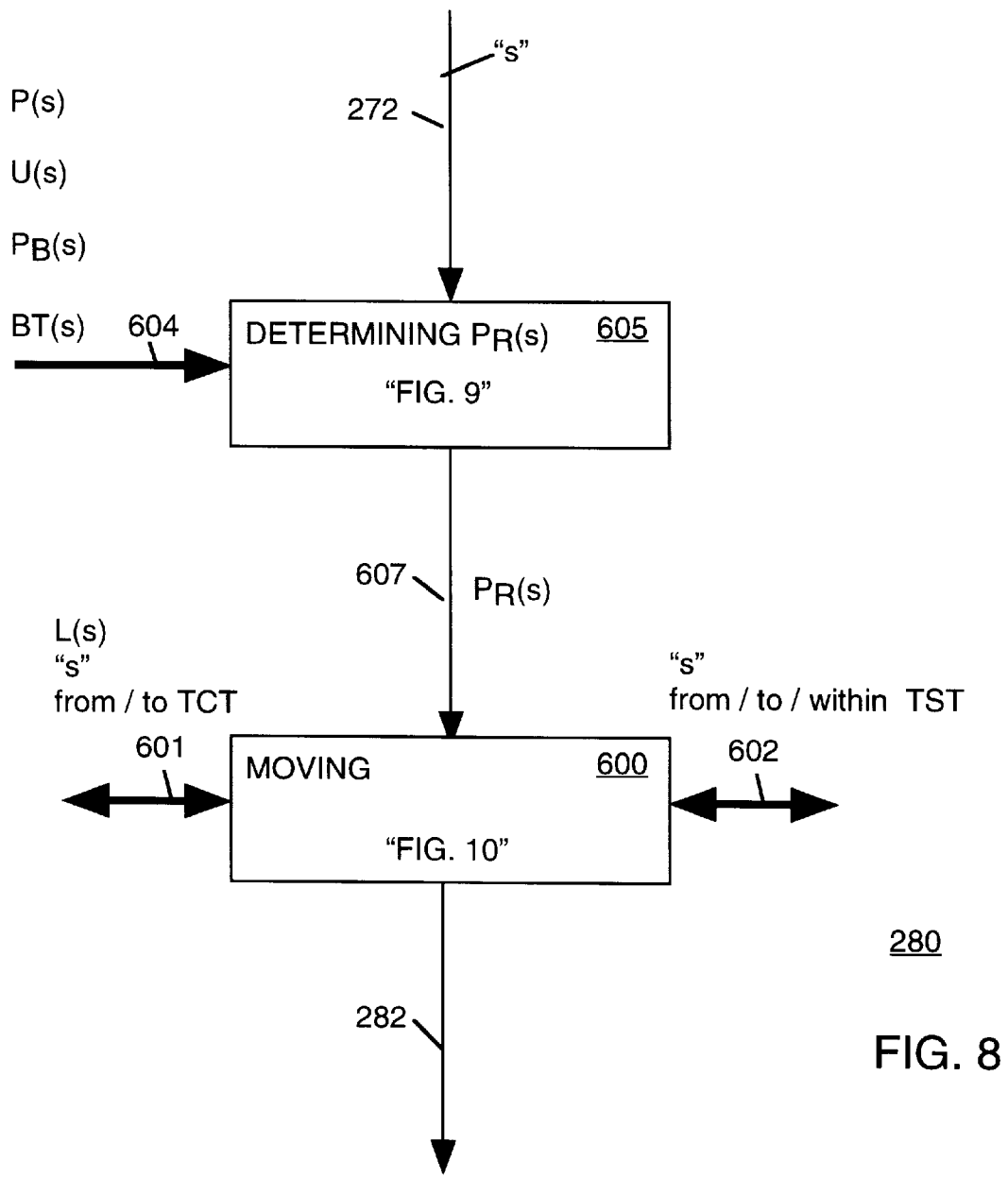
FIG. 8 illustrates a simplified flow chart diagram with more details for a re-scheduling step of the method of FIGS. 5A–B.
Figure 9:
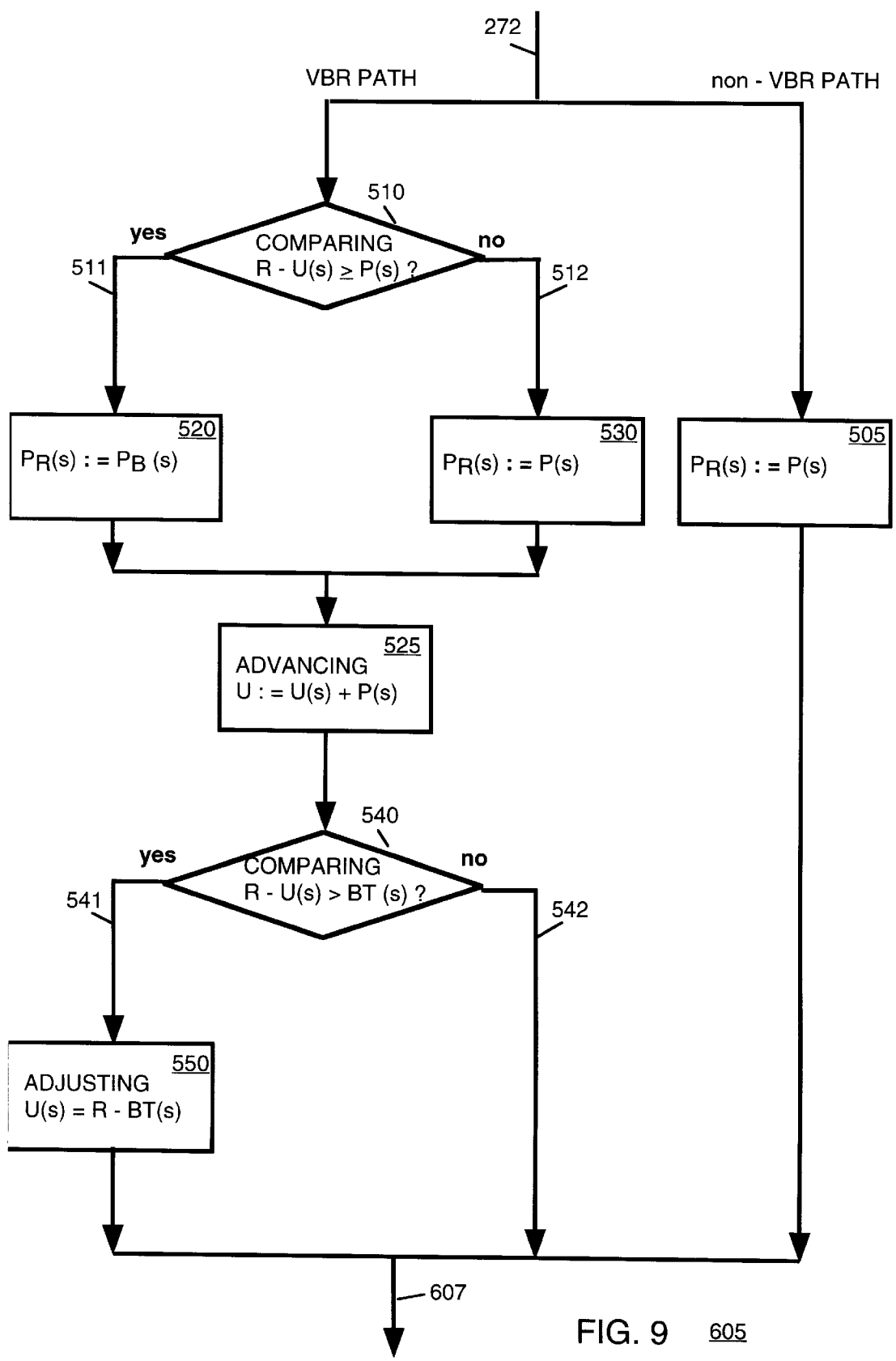
FIG. 9 is a simplified flow chart diagram illustrating a determining step which is part of the re-scheduling step of FIG. 8.
Figure 10:
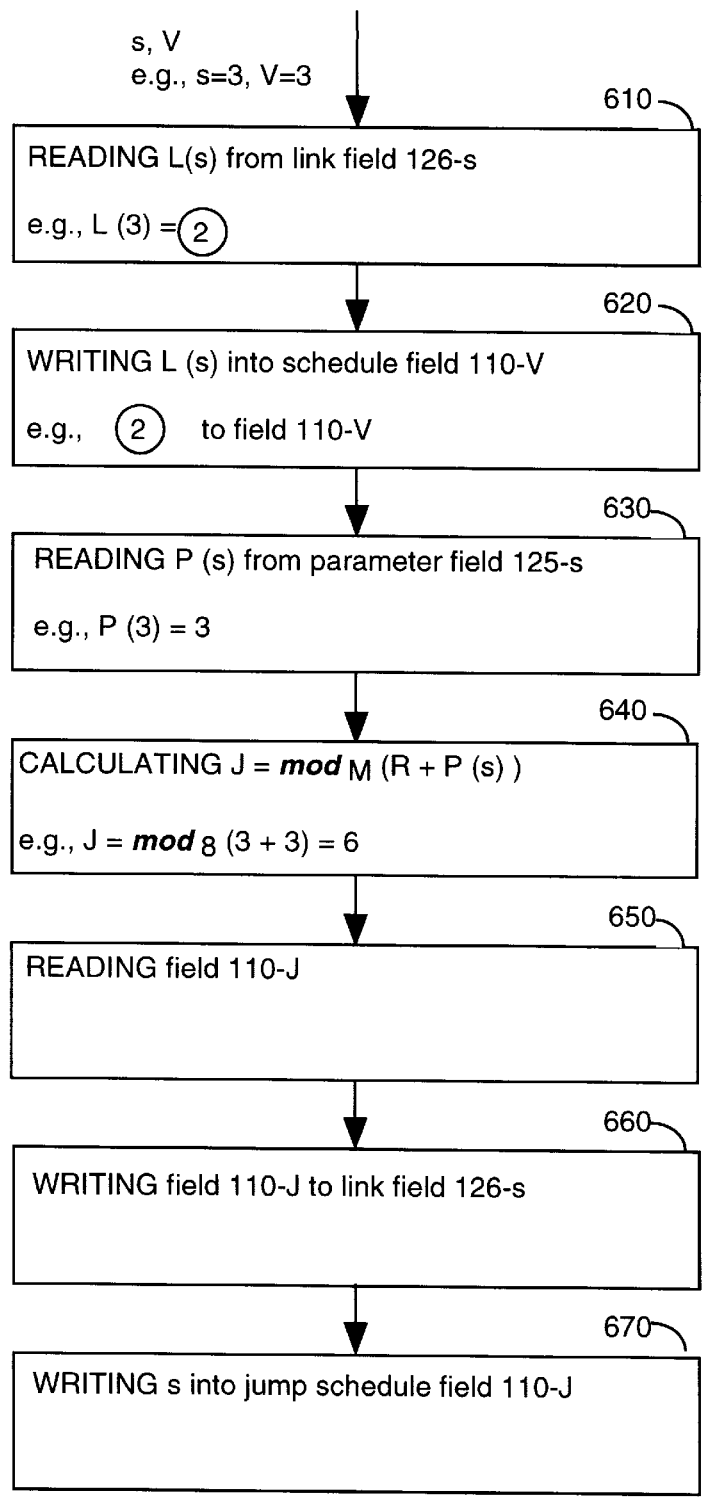
FIG. 10 is a simplified flow-chart diagram of a moving step which is also part of the re-scheduling step of FIG. 8.

Apparatus and method of the present invention are explained in the following order: (a) in the text, introducing mathematical symbols; (b) by FIG. 1, illustrating system 100 of the present invention; (c) by FIG. 2, illustrating cells provided by system 100 during time slots in a first example (A); (d) by FIG. 3, illustrating cells provided by system 100 during time slots in a first example (B); (e) by FIG. 4, illustrating a variable bit rate (VBR); (f) by FIG. 5, illustrating a preferred method of the present invention; (g) by FIG. 6, illustrating channel identifiers ①②③④⑤ and ⑥ in a table (TST) of system 100 during several time slots for example (A); (h) by FIG. 7, illustrating ①② and ③ in TST for example (B); (i) by FIG. 8, illustrating re-scheduling step 280 which is part of method 500; (j) by FIG. 9, illustrating details of determining step 605 which is part of step 280; (k) by FIG. 10, illustrating details of moving step 600 which is also part of step 280; (l) by table 1, explaining method 500 for example (A); (m) in the text, summarizing method 500 for example (A); (n) by table 2, explaining method 500 for example (B); and (o) in the text, summarizing method 500 for example (B).

(a)

For convenience of explanation, mathematical symbols used in the following are introduced. Index variables or "pointers" V, V', V", U (s), and R are conveniently positive integer numbers of the set {M} which is, for example defined as:

$$\{M\}=\{1, 2, 3, \ldots M\} \tag{1}$$

For A, B being positive integers and C∈{M}, a modulo addition mod (A+B)=C is defined as $$C=(A+B) \text{ for } A+B \leq (M-1) \tag{2}$$

$$C=(A+B)-M \text{ for } A+B>(M-1) \tag{3}$$

A modulo subtraction is defined as $$C=(A-B) \text{ for } A-B>0 \tag{4}$$

$$C=(A-B)+M \text{ for } A-B<0. \tag{5}$$

For example, in the set $$\{M\}=\{1, 2, 3, 4, 5, 6, 8\} \tag{6}$$

of M=8 elements, and A=2 and B=3, C is calculated as:

$$C=\mathrm{mod}(A+B)=\mathrm{mod}(3+6)=1 \quad \text{(definition 2)}$$

$$C=\mathrm{mod}(A-B)=\mathrm{mod}(3-6)=5 \quad \text{(definition 3)}$$

For convenience, the number M of elements in set {M}, also called "base", can be indicated as subscript, such as in e.g., $\mathrm{mod}_m$ (A+B).

The symbol ":=" (colon with equal sign), which is commonly used in the programming art, illustrates that a variable (e.g., X) standing left of ":=" is assigned the value expressed to the right of ":=". The variable on the left can appear also on the right side. For example, in "X:=X+1", variable X having an initial value of e.g., X=2, is incremented by 1 and obtains the final value X=3.

Abbreviations, such as 7xx, 8xx, and others stand collectively for reference numbers in the FIGS., wherein the "x" can mean any digit between 0 and 9.

(b)

FIG. 1 is a simplified block diagram of communication system 100 of the present invention. System 100 comprises processor 150, channel memory 160, communication line 180, transmit connection table 146 (hereinafter TCT), transmit scheduler table 144 (hereinafter TST), and program memory 148. Bus 152 permits the transfer of variables (e.g., V), data cells C (s,r) and instruction commands between processor 150, channel memory 160, program memory 148, TST and TCT. At terminal 151, communication line 180 is coupled to an ATM network (not shown).

Channel memory 160 has a plurality of S channels 161 identified by CH (s) with single index s=1 to S. Each channel CH (s) has Q data cells 102 identified by C (s,q) with index pair (s,q) (s=1 to S, q=1 to Q). It is assumed that every channel CH (s) has an equal number Q of data cells. This is convenient for explanation, but not necessary for the invention. A person of skill in the art is able to provide data cells 102 into channel memory 160 by means (e.g., data and address busses, load commands) well known in the art. Idles cells 105, (also "C (idle)") having no payload are generated, preferably, in processor 150 and sent to communication line 180. At any time, channel CH (s) can be able to send cells or can be silent.

According to a series of steps stored in program memory 148, processor 150 accesses information stored in TST and TCT and advances data cells C (s,r) into communication line 180 according to a method of the present invention. As for example in FIG. 1, cells C (1,1), C (2,1), C (1,2) have already been moved from channel memory 160 (cells in italics) to communication line 180 (cells typed bold).

TST is a cyclic table having V=1 to M schedule fields 110-V, and optionally, further V'=1 to M schedule fields 110'-V', V"=1 to M schedule fields 110'-V" and so on. Each schedule field 110-V, 110'-V', and 110-V" can store one or more channel identifiers "s" ("token") or can be empty. In the following text and in FIGS. 6–7, channel identifiers "s" are written by encircled integer numbers s, for example:

$$①, ②, ③, ④, ⑤, \text{ and } ⑥ \tag{7}$$

Preferably, TST is organized as a time-slot table, wherein one field such as field 110-V corresponds to one time slot. This is convenient, but not essential for the invention. A person of skill in the art is able, based on the description herein to organize TST in a different way without departing from the scope of the invention.

TCT has, preferably, s=1 to S parameter fields 125 (also 125-s) containing traffic parameters W (s) for each channel CH (s) (s=1 to S) such as, for example:

(i) the kind of service of CH (s), such as, for example, a Constant Bit Rate (CBR), a Variable Bit Rate (VBR), and an Unspecified Bit Rate (UBR);

(ii) a period P (s);

(iii) for VBR-channels: a Sustain Cell Rate (SCR) or the period P (s) as an equivalent, a Peak Cell Rate (PCR) or the burst period PB (s) as an equivalent, a sustain pointer U (s) and a burst tolerance BT (s) which are explained in section (e);

(iv) priority information (e.g., "high" for voice phone channels, "medium" for traffic supervision channels, "low" for e-mail channels).

TCT also has, preferably, s=1 to S link fields 126 (also 126-s) having entries identified by L (s) (s=1 to S). L (s) for channel CH (s) comprises the channel identifier "s" of another channel CH (s). The underscoring of the letter "s" is used for distinction. For example, dashed line 127 from link field 126-s (with L (s)=①) points to link field 126-1 W (1) and L (1) of channel CH (1). Program memory 148 stores variables V (120), V' (120'), V" and R (130), as well as stores instruction commands for processor 150 and other entries explained in connection with FIG. 5. Variable V, also called "virtual pointer" shows to field 110-V of TST as indicated by dashed line 121 (e.g., to field 110-2. Variable R ("real pointer") is, preferably, larger or equal V (R≧V) and shows to field 110-R (dashed line 131 to e.g., field 110-4). An optional variable U (s) in TCT, called sustain pointer of channel CH (s) shows to field 110-U (s), 110'-U (s), or to 110"-U (s) (dashed line 141 to e.g., field 110-2)).

(c)

FIG. 2 (example A) and FIG. 3 (example B) are simplified state-time diagrams 700 and 800 illustrating by way of examples (A) and (B), respectively, how communication system 100 transmits cells C (s,r) from channel memory 160 to communication line 180. These examples are not intended to be limiting and are provided only for the convenience of explanation. The horizontal axis show the time t which is divided into substantially equal time slots TS (R) (R=1 to M). It is convenient for explanation to have time slots TS (R) given here by real pointer R (cf. 130, 131 in FIG. 1). In the examples for M=8, it is assumed that TS (R) (R=1 to 8) repeats as time t progresses.

The vertical axis show channels CH (s) by blocks. For further illustrations, it is assumed that communication system 100 transmits cells 102 (C(s,q)) and 105 (C(idle)) beginning from t=0 and does not transmit cells for t<0.

FIG. 2 shows diagram 700 for example (A) with 6 channels CH (1) to CH (6). Channels CH (1), CH (2) and CH (3) have a high priority (V); channels CH (4) and CH (5) have a medium priority with (V'), and channel CH (6) has a low priority (V"). CH (1) and CH (2) have a constant bit rate (CBR); and CH (3) to CH (6) have an unspecified bit rate (UBR). In example (A) of FIG. 2, cells are transmitted in the following order:

in time slot TS (1):

C (idle)(event 701) and

C (idle)(event 702);

in time slot TS (2):

C (1,1), (event 703, first cell from CH (1)) and

C (2,1)(events 703, first cell from CH (2));

in time slot TS (3):

C (3,1) (event 705, first cell from CH (3)) and

C (idle) (event 706);

in time slot TS (4):

C (1,2), (events 707, second cell from CH (1)) and

C (2,2), (event 708, second cells from CH (2));

in time slot TS (5):

C (4,1) (event 709, first cells from CH (4)) and

C (5,1) (event 710, first cell from CH (5));

in time slot TS (6):

C (3,2) (event 711, second cell from CH (3)) and

C (1,3), (event 712, third cell from CH (1));

in time slot TS (7):

C (2,3) (event 713, first cell from CH (2)) and

C (6,1) (event 714, first cell from CH (6));

and so forth. $N_{slot}=2$ data cells are transmitted during each time slot TS (R).

In example (A), cells C (1,r) and C (2,r) (beginning with e.g., r=1) from high priority channels CH (1) and CH (2) are transmitted at substantially every 2 time slots TS (m).

(d)

FIG. 3 shows example (B) in which high priority channels CH (1) and CH (2) have a constant bit rate (CBR) and low priority channel CH (4) has a variable bit rate (VBR). VBR is also explained in FIG. 4. In example (B) of FIG. 3, cells are transmitted in the following order:

in time slot TS (1):

C (1,1) (event 801, first cell from CH (1)) and

C (2,1) (event 802, first cell from CH (2)), in time slot TS (2):

C (1,2) (event 803, second cell from CH (1)) and

C (2,2) (event 804, second cell from CH (2)), in time slot TS (3):

C (1,3) (event 805, third cell from CH (1)), and

C (2,3) (event 806, third cell from CH (2)), in time slot TS (4):

C (1,4) (event 807, fourth cell from CH (1)), and

C (2,4) (event 808, fourth cell from CH (2)), in time slot TS (5):

C (1,5) (event 809, fifth cell from CH (1))

C (3,1) (event 810, first cell from CH (3))

in time slot TS (6):

C (3,2) (event 811, second cell from CH (3)),

C (idle) (event 812)

in time slot TS (7):

C (3,3) (event 813, third cell from CH (3)),

C (idle) (event 814)

In example (B), channels CH (1) and CH (2), CH (3) have periods of P (1)=1 and P (2)=2. That means, data cells can be transmitted from channels CH (1) and CH (2) every 2 time slots TS. VBR-channel CH (3) has a period P (3)=2, a burst period $P_B(3)=1$ and a burst tolerance BT=3. In other words, 1 data cell from CH (3) can be transmitted every 2 time slots TS, or in TB=3 consecutive time slots (e.g., the burst of TS (5), TS (6), and TS (7) ) one single cell is transmitted at every time slot TS.

(e)

FIG. 4 illustrate simplified time diagrams 900 and 950 for explaining the variable bit rate (VBR). Diagrams 900 and 950 have a common horizontal axis for discrete time slots TS (r). Time slots TS (r) are similar to the time slots TS (R) introduced in FIGS. 2–3. The counter variable "r" is an integer which can be greater than M. Diagrams 900 and 950 are intended to be non-limiting examples.

Diagram 900 shows the transmission of data cells from a VBR-channel CH (s) by event blocks 901–907. For example, during time slots TS (1) to TS (8), processor 150 transmits a single data cell C (s,q) every second time slot TS (r). For example, processor 150 transmits:

C (s,1) in TS (1) (event 901)

C (s,2) in TS (3) (event 902)

C (s,3) in TS (5) (event 903) and

C (s,4) in TS (7) (event 904)

During time slots TS (9) to TS (11), processor 150 transmits a single data cell C (sq) in every time slot TS (r), such as, for example:

C (s,5) in TS (9) (event 905)

C (s,6) in TS (10) (event 906)

C (s,7) in TS (11) (event 907)

C (s,5), C (6) and C (s,7) form a so-called "burst" which has in the example a burst size BS of 3:

$$BS=3 \qquad (8)$$

The burst size depends, for example, on the availability of data in the VBR-channel. A maximum burst size is abbreviated as MSB or BT for "burst tolerance". In all time slots TS (r), processor 150 can optionally transmit data cells from other channels, but this is not essential.

Diagram 950 shows the VBR (variable bit rate) which is the number of transmitted data cells C (s,q) per time slot. The VBR can be (i) the sustain cell rate (SCR) with trace 951 from TS (1) to TS (8), or (ii) the peak cell rate (PCR) with trace 952 from TS (9) to TS (11). In the example of FIG. 4, the SCR is one (1) data cell in two (2) time slots, or $$SCR=½ \text{ cell/slot} \qquad (9)$$

with cell/slot as a measurement unit. The PCR is one (1) data cell in one (1) time slots, or $$PCR=1 \text{ cell/slot} \qquad (10).$$

For convenience, a reciprocal representation is given by "periods". Periods P (s) and burst periods $P_B$ (s) is defined as $$P(s)=1/SCR \text{(for example, 2 slot/cell)} \quad (11)$$

$$P_B(s)=1/PCR \text{(for example, 1 slot/cell)} \quad (12)$$

In the explanation of method 500 of the present invention, the unit (slot/cell) of P (s) and $P_B$ (s) is left out for simplicity. P (s) and $P_B$(s) are compared to pointers (e.g., V and R).

Data transmission capacity can be expressed in various ways. Communication line 180 itself has a bit rate F of e.g., F=155 Megabit per second. In every time slot TS (R), communication line 180 transmits a predetermined number $N_{slot}$ of cells C (s,q) or C (idle), giving a cell rate $N_{slot}$/TS (m) (cell per time slot). In examples (A) and (B), $N_{slot}$ equals $N_{slot}$=2.

Preferably, communication system 100 is able to transmit cells C (s,q) from e.g., S=20 channels and TST has e.g., M=1024 fields 110-V. During one timeslot TS (R), e.g., $N_{slot}$=8 cells are transmitted. For example, a CBR-channel CH (s) having a period of P (s)=256, sends data cells to communication line 180 with a resulting bit rate of eg., around 0.6 Megabit per second (F/P, e.g., 155/256=0.6 Megabit per second). Or, an UBR-channel CH (s) with P (s)=16 sends with a higher bit rate of e.g., around 9.7 Megabit per second.

Figure 5A:
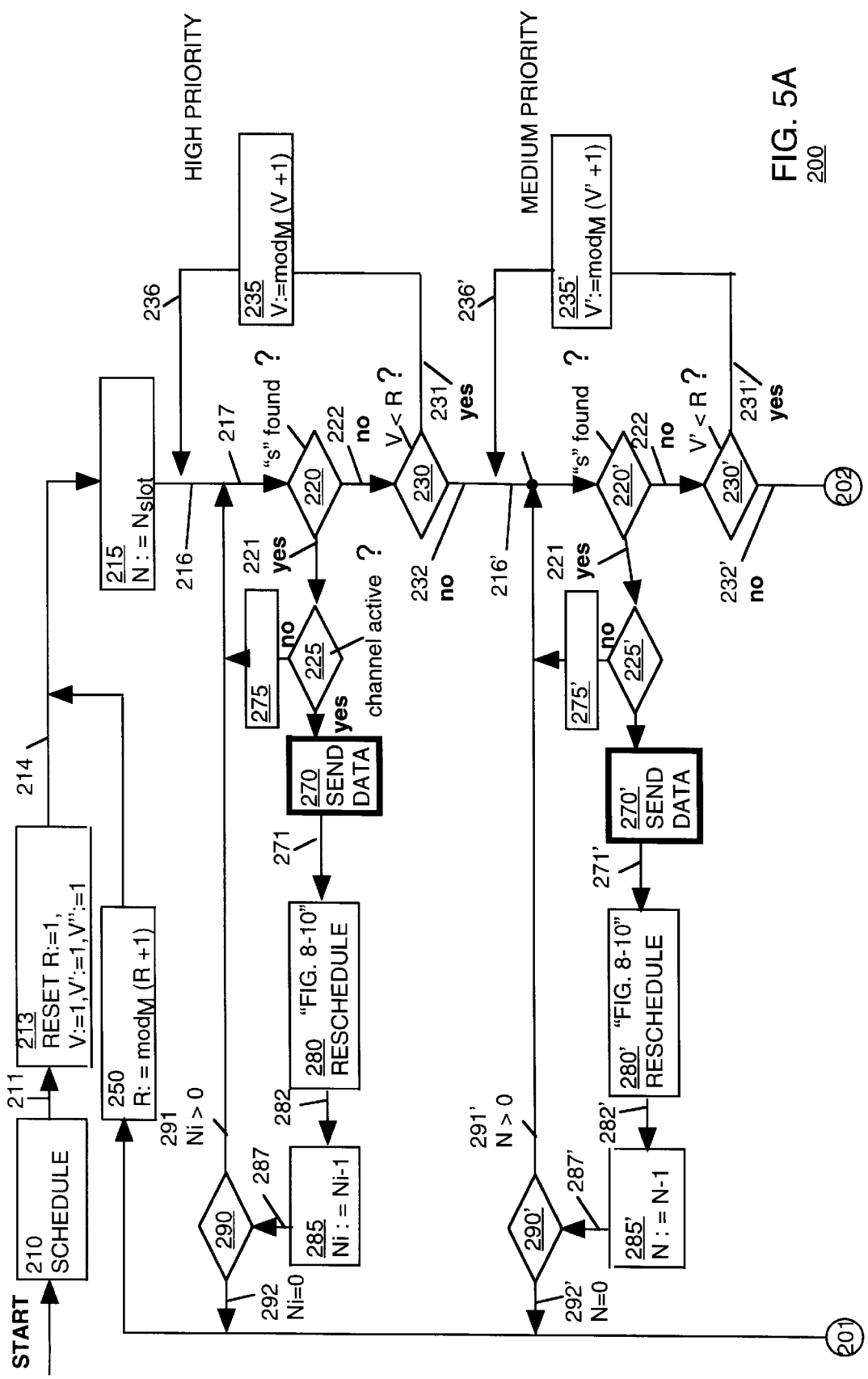
FIG. 5A–B is a simplified flow chart diagram illustrating a method of the present invention for the communication system of FIG. 1.
Figure 5B:
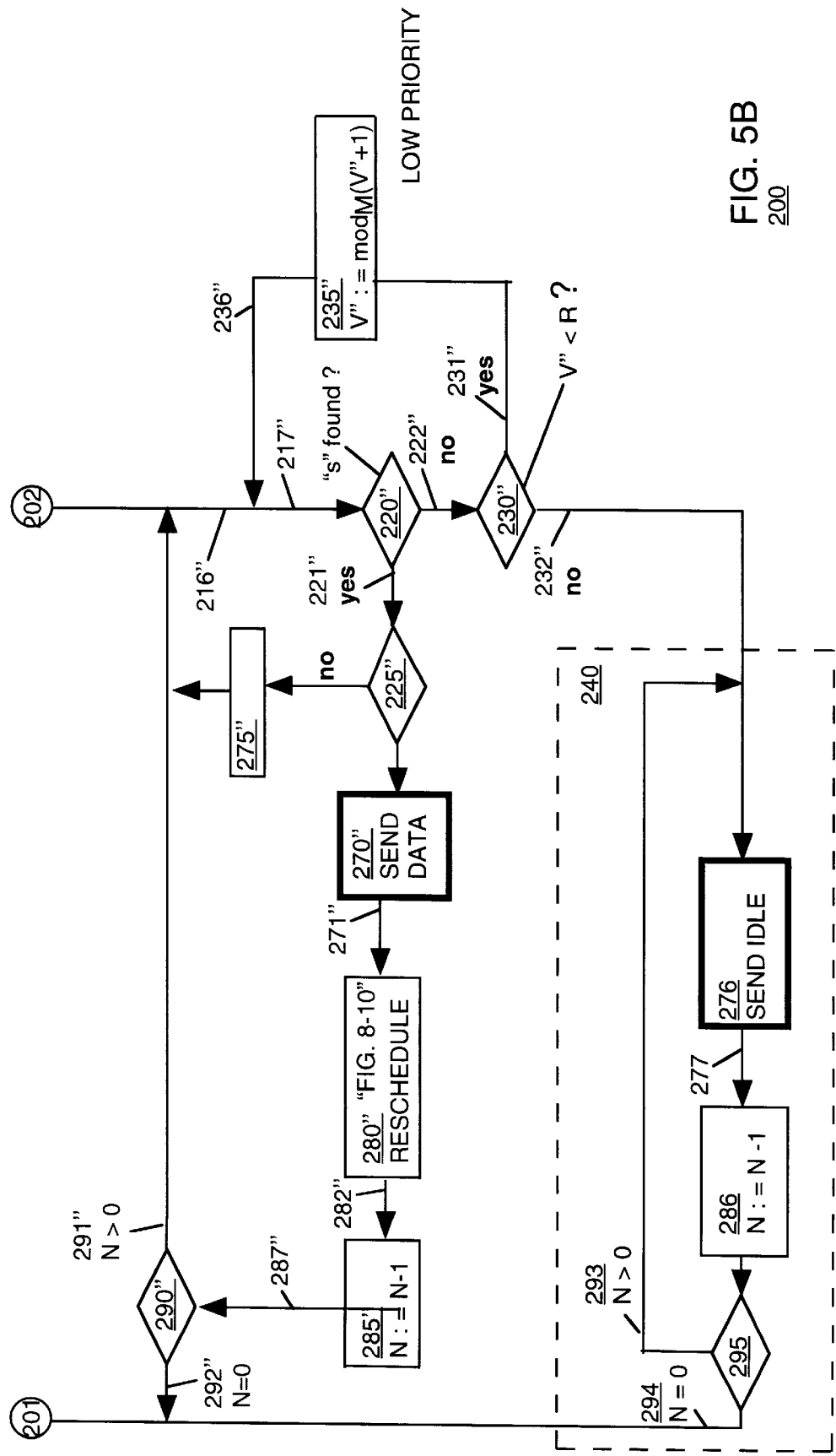

FIG. 5A–B is a simplified flow chart diagram illustrating method 200 of the present invention for operating communication system 100 of FIG. 1. FIG. 5B is a continuation of FIG. 5A coupled by place holders 201 and 202. Preferably, method 200 comprises steps 210, 213, 215, 220, 225, 230, 235, 250, 270, 275, 276, 280, 285, 286, 290 and 295 illustrated by blocks. Solid lines 211, 214, 216, 217, 221, 222, 231, 232, 236, 271, 277, 282, 287, 291, 292, 293, 294 coupling the steps indicate a preferred method flow. Steps with reference numbers having no prime markers (e.g., step 220) are executed with the highest priority.

Optionally, processor 150 executes steps 220, 225, 230, 270, 275, 280, 285, and 290 two or more times for different priorities. In the example of FIGS. 5A–B, these steps have reference numbers with prime markers (e.g., step 220') for medium priority or double-prime markers (e.g., step 220") for low priority. Persons of skill in the art are able, based on the description herein, to apply method 200 to applications with more or with less priorities.

For convenience, the blocks for step 270, 270', 270", and 276 in which processor 150 transmits cells are illustrated bolder than the blocks of the other steps. Conveniently, steps and lines of FIG. 5 represent instruction commands for processor 150 which are, preferably, stored in program memory 148. Query steps 220, 225, 230, 290 and 295 represent steps with conditional deviations ("yes" or "no") of the step sequence.

(f1)

For convenience of explanation, the steps without prime-markers are explained first. It is assumed, that all channels have the same priority. The priority mechanism in connection with the primed steps is explained later (see f2). Primed and double-primed steps are not executed. Line 232 goes directly to step 276. Details for these "unprimed" steps are as follows:

In step 210, labeled "SCHEDULE", processor 150 writes channel identifiers "s" into schedule fields 110-V. Conveniently, the number of identifiers is equal to S. Preferably, processor 150 writes identifiers into fields 110-V according to the periods P (s) of the channels (V=P (s)). Every schedule field 110-V can receive a single, two or more channel identifiers or can stay empty. Line 211 leads to step 213.

In step 213, labeled "RESET", pointer R is initially assigned to a single schedule field 110-R. Preferably, pointer R=1 is initially assigned to field 110-1 and pointer V=1 is assigned field 110-1. Steps 210 and 213 can be performed in either order. Line 214 leads to step 215.

In step 215 an auxiliary counter variable N is assigned to $N_{slot}$ (see section (e)). N indicates how many cells can still be transmitted in a current time slot TS (R). In later steps (e.g., 285, 286, 295, 290) N will be decremented by one and compared with zero every time system 100 sends out a cell. N is used for controlling the method flow. Persons of skill in the art are able, based on the description herein, to control the preferred method flow also by other means. For example, a counter variable can also be incremented and compared to $N_{slot}$. Step 215 is the first steps in a loop of steps 220, 225, 230, 235, 250, 275, 276, 280, 285, 286, 290 and 295. In the loop, pointer R remains constant. Lines 216 and its continuation line 217 lead to the next step.

In query step 220 (labeled "s found?"), processor 150 is looking up for channel identifiers "s" in the schedule field 110-V identified by V. If processor 150 finds a single identifier (cf. "yes"-line 221), then processor 150 follows steps 225, optionally 275, 270 (sending data cells), 280, 285 and 290. If processor 150 finds two or more identifiers then processor 150 performs steps 225, 275, 270, 280, 285, and 290 in repetitions.

But assuming first, that schedule field 110-V is empty so that processor 150 does not find an identifier (cf. "no"-line 222).

In query step 230 ("V<R?"), processor compares pointer V with pointer R. If pointers V and R are different ("yes"-line 231), then pointer V is modified in step 235 and step 220 is repeated (line 236 from step 235 to step 220). In step 230, processor 150 preferably, investigates whether V has reached R or not, e.g.:

$$V<R? \quad (13)$$

If yes, pointer V is modulo incremented by one (step 235):

$$V:=\text{mod}_M(V+1) \quad (14)$$

If not (e.g., V=R), processor 150 sends idle cells C (idle). This is explained later.

Assume now, that in step 220, processor 150 has identified one channel identifier "s" ("yes"-line 221). In step 225, processor 150 tests if the identified channel CH (s) is active. An active channel CH (s) is able to provide a data cell C (s,r). In step 270, ("SEND DATA"), processor 150 transmits a single data cell C (s,r) from channel CH (s) to communication line 180. In step 280, ("RESCHEDULE") processor 150 moves the channel identifier from field 110-V to a different field 110-J. The different field 110-J is identified by jump index J. Preferably, the channel identifier "s" is thereby deleted from field 110-V. Details for step 280 are explained in connection with FIGS. 8–10. In step 285, processor 150 decrements counter N by 1:

$$N:=N-1 \quad (15)$$

In query step 290? processor 150 compares N to $N_{slot}$. N is either larger than zero (N>0, line 291) or zero (N=0 line 292). Line 291 going back to step 220 indicates that processor 150 looks up for a next identifier in the same field 110-V. Processor 150 now performs steps 225, 270, 280, 285 and 290 again for further channel identifiers. If the capacity of communication line 180 to carry cells in timeslot TS (R) is exhausted (N=0, line 292), then processor 150 finishes the loop and goes to the next time slot (step 250). It can happen, that in the actual time slot TS (R), a channel CH (s) is passive (not active) although data transmission has been scheduled ("no" at query step 225). In such cases, processor 150 performs step 275 in which channel identifier "s" is moved to a different location within TST. Step 275 is similar to step 280 (see FIG. 8), so that a person of skill in the art does not need further explanation.

Assume now, that in step 220 processor 150 has not found an identifier and that pointer V has already reached pointer R (step 230, 232). Illustrated by a dashed frame 240 with steps 276, 286, 295 and lines 277, 294 and 293, processor 150 sends N idles cells C (idle) to communication line 180. For example, processor 150 sends a single idle cell C (idle) in step 276 ("SEND IDLE"), decrements N in step 286 ("N=N−1"), compares N to zero in step 295, repeats steps 276, 286 and 295 as long as N>0 (line 293) and goes to step 250 (via line 294).

When counter N has reached zero (cf. compare steps 290 and 295), then processor finished the loop. In step 250, pointer R goes to the next time slot, preferably, by incrementation:

$$R := \text{mod}_M (R+1) \qquad (16)$$

Processor 150 has now reached step 215 again. Note, that at the end of the loop, pointer V is not automatically incremented. Unless incremented by step 235, pointer V stays unchanged. In other words, pointer V is conditionally advanced to pointer R when (i) field 110-V is empty (cf. step 220, "no"-line 222) and (ii) V lags behind R (cf. step 230, "no"-line 230). The sending of idle cells (which is not scheduled) can be considered as a remedy if all attempts to identify channels (cf. step 220) have repeatedly failed.

(f2)

Now, the priority mechanism is explained in connection with the primed and double-primed steps. Line 232 is continued by line 216'; and step 276 follows step 230" on line 232". In step 210 ("SCHEDULE"), processor 150 writes channel identifiers for high priority channels into schedule fields 110-V, channel identifiers for medium priority channels into schedule fields 110'-V', and channel identifiers for medium priority channels into schedule fields 110"-V". In step 213 ("RESET"), pointer R is initially assigned to a single schedule field 110-V. Preferably, the pointers are initially assigned as: pointer R to field 110-1 (R=1), pointer V to field 110-1 (V=1, high priority), pointer V' to field 110'-1 (V'=1, medium priority) and pointer V" to field 110"-1 (V"=1 low priority). In step 215 counter variable N is assigned to $N_{slot}$.

Assuming that at the beginning of time slot TS (R), processor 150 has executed steps 220 and 230 (high priority) and is at "no"-line 232 of query step 230. There can be various reasons for this state. For example, system has sent out less than $N_{slot}$ cells (step 270), or processor 150 did not find channel identifiers in high priority fields 110-V (see step 220, line 222, steps 230, 235).

Communication line 180 still can carry N data cells during the present time slot TS (R). Now, processor 150 searches for channel identifiers "s" in medium priority fields 110'-V'. Processor 150 performs primed steps 220', 230', 235', 225', 275', 270', 280', 285', 290' similarly to the corresponding unprimed steps. At the end of this medium priority loop, system 100 has either used the capacity of communication line 180 completely (see steps 285, 290, N=0) or is still able to transmit further cells (e.g., N≠0, "no"-line 232' at step 230').

Unless system 100 goes to the next time slot (step 250 for N=0), system 100 investigates low priority fields 110"-V". Double-primed steps 220", 230", 235", 225", 275", 270", 280", 285", 290" are executed corresponding to the unprimed and primed steps. If processor 150 does not find further channel identifiers steps 220" and virtual pointer V" has reached R (query step 230" at "no"-line 232"), then processor 150 sends idle cells C (idle) (e.g., steps 276, 286, 295).

This is an advantage of the present invention. In other words, according to method 200 of the present invention, processor 150 looks up in schedule fields (e.g., 110-V, 110'-V, 110"-V") until processor 150 does not find any more channel identifiers. The fields in which processor 150 looks up are determined by time slot pointer R and by virtual pointers V, V" and V". Also, the number of schedule fields which are accessed by processor 150 is decreased when pointers V, V' and V" move closer to pointer R. This features allows an optimal capacity utilization of communication line 180.

(g)

FIG. 6 illustrates schedule fields 110-V, 110'-V', and 110"-V" of TST for V, V', V"=1 to M=8 of example (A). Channel "s" identifiers are, e.g., ①, ②, and ③ in high priority fields 110-V, ④ and ⑤ in medium priority fields 110-V', and ⑥ in low priority fields 110"-V". Channel identifiers "s" and lines between them are identified by reference numbers 301–328 whose order indicates a preferred sequence in time.

Channels identifiers ①②③④⑤ and ⑥ (bold circles) having numbers 301–306 illustrate how processor 150 schedules channels CH (1) to CH (6) in scheduling step 210 (FIG. 5); and channel identifiers ①②③④⑤ and ⑥ with numbers 308, 310, 312, 314, 316, 320, 322, 324, 326, and 328 illustrate how processor 150 re-schedules channels in steps 280, 280', and 280" (FIG. 5).

Initially in step 210, processor 150 writes: (i) ① ② and ③ to high priority fields 110-V according to the periods of CH (1) to CH (3), i.e., ① (301) and ② (302) to field 110-2 (period P (2)=2 and P (3)=2) and ③ (303) to field 110-3 (period P (3)=3); (ii) ④ and ⑤ to medium priority fields 110'-V' according to the periods of CH (4) and CH (5), i.e. ④ (304) and ⑤ (305) to field 110'-4 (P (4)=4 and P (5)=4); and (iii) ⑥ to high priority fields 100'-m' according to the period of CH (6), i.e. ⑥ (306) to field 110"-4.

In re-scheduling steps 280, 280' and 280" processor 150 moves channel identifiers ①②③④⑤ and ⑥ to fields identified by jump index J. Processor 150 moves the channel identifiers within fields 110-V, 110'-V' and 110"-V" as follows: during time slot TS (2), ① (301) from field 110-2 to field 110-4 (line 307) and ② (302) from field 1 to field 110-4 (line 309); during time slot TS (3), ③ (303) from field 110-3 to field 110-6 (line 311); during time slot TS (6), ① from field 110-4 to field 110-6 (line 313) and ② from field 110-4 to field 110-6 (line 315); during time slot TS (5), ④ from field 110'-4 to field 110'-1 (dashed line 317) and ⑤ from field 110'-4 to field 110'-1 (dashed line 319) during time slot TS (6), ⑥ from field 110-6 to field 110-3 (dashed line 321), ① from field 110-6 to field 110-8 (line 323); and during time slot TS (7), ② from field 110-6 to field 110-1 (dashed line 325) and ⑥ from field 110"-4 to field 110"-3 (dashed line 327).

(h)

FIG. 7 illustrates schedule fields 110'-V, and 110'-V' of TST for V, V'=1 to M=8 time slots of example (B). Channel identifiers "s" are, e.g., ① and ② in high priority fields 110-V and ③ in low priority fields 110'-V'. Channel identifiers "s" and lines between them are identified by reference numbers 401–431 whose order indicates a preferred sequence in time. Channel identifiers ① ② and ③ (bold circles) having numbers 401, 402 and 403 illustrate how processor 150 schedules channels CH (1) to CH (3) in scheduling step 210 (FIG. 5). Channel identifiers ① (numbers 405, 409, 413, 417, 421, 427) and ② numbers 407, 411, 415, 419, 423) illustrate how processor 150 re-schedules channels CH (1) and CH (2) in re-scheduling step 280. Identifiers ③ (numbers 425, 429, 431) illustrate re-scheduling in step 280'. Initially in step 210, processor 150 writes and ① and ② to field 110-1 because of periods P (1)=1 and P (2)=1 of channels CH (1) and CH (2). Processor 150 writes ③ to field 110'-1 (for the low priority) because of period P (3)=1. In repetitions of re-scheduling steps 280, processor 150 moves ① from field 110-1 to field 110-2 (line 404), from field 110-2 to field 110-3 (line 412) and so on. Similarly, processor 150 moves ② from, for example, field 110-1 to field 110-2 (line 406). Processor 150 also moves (repeated steps 280') identifier ③. The distance of moving (from a current pointer V to the jump index J) is not equal for all steps. In example (B), ① moves by one field (corresponding to period P (1)=1, cf. lines 404, 408, 412, 416, 420) or by 2 fields (cf. line 426). ② moves by 1 field (cf. lines 406, 410, 414, 418) or by 3 fields (cf. line 422). ③ moves by 4 fields (cf. line 424), by 1 field (cf. line 428) according to the burst period $P_B(3)$=1, or by 2 fields (cf. line 430).

(i)

FIG. 8 illustrates a simplified flow chart diagram with more details for re-scheduling step 280 of method 200. Step 280' and 280" are performed in a similar way so that unprimed reference numbers in FIG. 8 include primed reference numbers. Re-scheduling step 280 comprises determining step 605 and moving step 600. Preferably, steps 605 and 600 are performed consecutively. Details for steps 605 and 600 are explained in connection with FIG. 9 and FIG. 10, respectively. Lines 272 and 282 are illustrate how FIG. 8 fits into FIGS. 5A–B.

In determining step 605, processor 150 reads the period P (s) from TCT (FIG. 1). Optionally, if channel identifier "s" identifies a VBR-channel, processor 150 also reads sustain pointer U (s), burst period $P_B$(s) and burst tolerance BT (s) from TCT. (line 604 to step 605). Determining step 605 delivers (line 607) parameter $P_R$(s) to step 600.

In moving step 600, processor 150 moves channel identifiers "s" within TST and identifiers and link entries L (s) between (from/to) TST and TCT. This is symbolized by double arrows 601 and 602 at step 600.

(j)

FIG. 9 is a simplified flow chart diagram illustrating determining step 605 which is part of re-scheduling step 280. Between lines 272 (cf. FIGS. 8 to 5A–B) and line 607 (cf. FIG. 8), determining step 600 has a non-VBR path with single step 505 and a VBR-path with steps 510, 520, 530, 535, 540, and 550. A person of skill in the art is able to select the appropriate paths by, for example, query steps which are not given for simplicity. In case, identifier "s" identifies a non-VBR channel (e.g., CH (1) to CH (6) in example (A) and CH (1)–CH (2) in example (B) ), the parameter $P_R$ (s) is obtained from P (s):

$$P_R(S):=P(S) \qquad (17)$$

Otherwise, $P_R$ (s) for VBR-channels is obtained as described in the following with comparing step 510, assign steps 520 and 530, advancing step 525, comparing step 540, and adjusting step 550.

Preferably, sustain pointer U (s) has been reset earlier to U (s)=1 (for all s=1 to S) in resetting step 213 (FIG. 5). In the VBR-path, determining step 605 begins with comparing step 510. Processor 150 calculates the difference between real pointer R and sustained pointer U (s) and compares this difference with the period P (s) of the channel CH (s):

$$R-U(s) \geq P(s)(\text{yes or no?}) \qquad (18)$$

If the sustain pointer U (s) lags behind the real pointer R by a magnitude of P (s) or by higher values (R−U≤P(s))("yes"-line 511), then the transmission of the following cells of channel CH (s) is scheduled with burst period $P_B$(s) to become a burst (assigning step 520). Otherwise ("no"-line 512), the next transmission is scheduled according to period P (s) (re-scheduling step 530). Preferably, period P (s) is larger or equal to burst period $P_B$(s):

$$P(s) \leq P_B(s). \qquad (19)$$

Steps 520 or 530 are followed by advancing step 525 in which U is incremented by P (s):

$$U(s):=\text{mod}_M(U(s)+P(s)) \qquad (20)$$

In comparing step 540, the difference between real pointer R and sustained pointer U is compared with the burst tolerance BT:

$$R-U(s)>BT(s)(\text{yes or no?}) \qquad (21)$$

For "yes" (line 541), adjusting step 550 sets to $$U(s):=R-BT(s). \qquad (22)$$

Otherwise ("no"-line 542) U remains unchanged.

(k)

FIG. 10 is a simplified flow-chart diagram of moving step 600 which is part of re-scheduling step 280. Steps 605 to 670, are preferably, performed consecutively. Such a sequence is convenient, but not essential for the invention.

Suppose, in step 220, 220' o 220" (FIG. 5), processor 150 has found a channel identifier "s" in fields 110-V, 110'V or 110"-V", respectively. In example (A) (FIGS. 2 and 6), for V=3 in time slot TS (3), processor 150 has just sent out cell C (3,1) from CH (3) and has just sent out C (idle). Channel CH (3) (③) is to be re-scheduled to time slot TS (6). The current identifier ③ in field 110-3 is no longer needed and will be moved. In other words, processor 150 is at the beginning of arrow 311 (FIG. 6) and moves ③ (reference 303) from field 110-3 to field 110-6 ③ with reference 316). In reading step 610, processor 150 reads the entries identified by L (s) from link field 126-s of TCT (FIG. 1). As mentioned above, L (s) contains a channel identifier "s" of another channel CH (s). For example, L (3) contains channel identifier ② of CH (2).

In writing step 620, processor 150 writes the channel identifier "s" from L (s) into schedule field 110-V. For example, ② goes into field 110-3. This is an important aspect, because with the advancing of time, processor 150 will look up in step 220 again. Writing step 630 ensures that TST does not get "out of entries". In the following steps 630 and 640, processor 150 calculates a time slot TS (J) in which CH (s) is to be scheduled again. In other words, the end of e.g., arrow 311 is under consideration.

In reading step 630, processor 150 reads parameter $P_R(s)$ which has been obtained in sub-steps 520, 530, or 505 of determining step 605. In case identifier "s" identifies a non-VBR channel CH (s), then processor 150 can read $P_R(s)=P$ (s) from parameter field 125-s of TCT. For example (A) at TS (3), reading step 610 tells processor 150 that channel CH (s)=CH (3) is to be scheduled with $P_R(s)=P$ (3)=3.

In calculating step 640, processor determines a jump index J. J is an index for the new time slot TS (J) in which CH (s) is to be scheduled again. In other words, J identifies jump schedule field 110-J. There are two conditions for determining J:
(a) channel CH (s) is expected to provide a new cell (e.g., C (3,2) ) at TS (J) and (b) the new time slot TS (J) should have an index within TST (e.g., $1 \leq J \leq M$).
Preferably, J is calculated by:

$$J := \mathrm{mod}_M(R+P(s)) \tag{23}$$

J points to field 110-J in TST. For condition (a), looking from R, CH (s) is able to provide a new cell not earlier than a period P (s) away. For condition (b), the modulo-operation is provided to go to lower time slot indices, or in other words, in FIGS. 6–7, dashed arrows (e.g., 325) go to the left. For example, $J:=\mathrm{mod}_8(3+3)=6$.

In reading step 650, processor 150 reads the channel identifiers "s" from jump schedule field 110-J.

In writing step 660, processor 150 writes the channel identifiers "s" from schedule field 110-J as a new entry into link field 126-s. L (s) is now a channel identifier which comes from that field 110-J in TST for a later time slot TS (J).

In writing step 670, processor 150, schedules the next transmission from CH (s) by writing the channel identifier s of CH (s) into jump schedule field 110-J. For example, ③ goes into field 110-6, so that channel CH (6) will be connected at the earliest at time slot TS (6).

(I)

Table 1 illustrates virtual pointer V for high priority in column (1), virtual pointer V' for medium priority in column (2), virtual pointer V" for low priority in column (3), real pointer R identifying time slots TS (R) in column (4), method steps of FIGS. 5A–C in column (5), short explanations in column (6), and events 7xx from FIG. 2 and channel identifier and lines 3xx from FIG. 6 in columns (7). Conveniently, one or two step are given in a single row. The time progresses when reading table 1 in top-down direction. As a help to distinguish consecutive R-cycles, blank rows are given at the end of each R-cycle. Where the method flow depends on query steps (e.g., steps 220 and 230), the query results (column 6) are given by "yes" and "no" and the reason for the result is given in parenthesis "( )". In columns (5) and (6), two steps are separated by semicolons ";". A summary at the end of table 1 explains the most important steps for each time slot TS (R).

TABLE 1

Method 200 for example (A)

| (1) | (2) | (3) | (4) | (5) | (6) | (7) reference |
|---|---|---|---|---|---|---|
| \multicolumn{4}{c}{pointers} | FIGS. | steps in | FIGS. |
| V | V' | V" | R | 5A–C | explanation to (5) | 2 and 6 |
| — | | | — | 210 | schedule CH (1) and CH (2) for TS (2); CH (3) for TS (3); and CH (4), CH (5), CH (6) for TS (4) | ① 301, ② 302, ③ 303, ④ 304, ⑤ 305, ⑥ 306 |
| 1 | 1 | 1 | 1 | 213 | R : = 1; V : = 1; V' : = 1; V" : = 1 | |
| | | | | 215 | N : = 2 | |
| | | | | 220 | "no" ( field 110-1 empty ) | |
| | | | | 230 | "no" ( V = R ) | |
| | | | | 220' | "no" ( field 110'-1 empty ) | |
| | | | | 230' | "no" ( V' = R ) | |
| | | | | 220" | "no" ( field 110"empty) | |
| | | | | 230" | "no" ( V" = R ) | |
| | | | | 240 | send 2 C (idle); N : = 0 | 701, 702 |
| 1 | 1 | 1 | 2 | 250;215 | R : = 2; N : = 2 | |
| | | | | 220 | "no" ( field 110-1 empty ) | |
| | | | | 230;235 | "yes" ( V < R ); V : = 2 | |
| 2 | 1 | | | 220 | "yes" ( field 110-2 with ① ② ) | |
| | | | | 225;270 | "yes"; transmit C (1,1) | 703 |
| | | | | 280;285 | ① to 110-4 (TS (4) ); N : = 1 | line 307 to ① 308 |
| | | | | 220 | "yes" ( field 110-2 with ② ) | |
| | | | | 225;270 | "yes"; transmit C (2,1) | 704 |
| | | | | 280;285 | ② to 110-4 ( TS (4) ), N : = 0 | line 309 to ② 310 |
| 2 | 1 | 1 | 3 | 250;215 | R : = 3; N : = 2 | |
| | | | | 220 | "no" ( field 110-2 empty ) | |
| 3 | | | | 230;235 | "yes" ( V < R ); V : = 3 | |
| | | | | 220 | "yes" ( field 110-3 with ③ ) | |
| | | | | 225;270 | "yes"; transmit C (3,1) | 705 |
| | | | | 280;285 | ③ to 110-6 (TS (6) ); N : = 1 | line 311 to ③ 312 |
| | | | | 220 | "no" ( field 110-3 empty ) | |
| | | | | 230 | "no" ( V = R ) | |
| | | | | 220' | "no" ( field 110'-1 empty ) | |
| | 2 | | | 230';235' | "yes" ( V' < R ); V' : = 2 | |
| | | | | 220' | "no" ( field 110'-2 empty ) | |
| | 3 | | | 230';235' | "yes" (V' < R ); V' : = 3 | |
| | | | | 220' | "no" ( field 110'-3 empty ) | |
| | | | | 230' | "no" ( V' = R' ) | |
| | | | | 220" | "no" ( field 110"-1 empty ) | |
| | | 2 | | 230";235" | "no" ( V" < R ); V" : = 2 | |
| | | | | 220" | "no" ( field 110"-2 empty ) | |
| | | 3 | | 230";235" | "no" ( V" < R ); V" : = 3 | |
| | | | | 220" | "no" ( field 110"-3 empty ) | |
| | | | | 230" | "no" ( V" = R ) | |
| | | | | 240 | send 1 C (idle) | 706 |
| 3 | 3 | 3 | 4 | 250;215 | R : = 4; N : = 2 | |
| | | | | 220 | "no" ( field 110-3 empty ) | |
| 4 | | | | 230 | "yes" ( V < R ); V : = 4 | |
| | | | | 220 | "yes" ( field 110-4 with ① ② ) | |
| | | | | 225;270 | "yes"; transmit C (1,2) | 707 |
| | | | | 280;285 | ① to 110-6; N : = 1 | line 313 to ① 314 |
| | | | | 220 | "yes" ( field 110-4 with ② ) | |
| | | | | 225;270 | "yes"; transmit C (2,2) | 708 |
| | | | | 280;285 | ② to 110-6; N : = 0 | line 315 to • ② 316 |
| 4 | 3 | 3 | 5 | 250;215 | R : = 5; N : = 2 | |
| | | | | 220 | "no" ( field 110-4 empty ) | |
| 5 | | | | 230;235 | "yes" ( V < R ); V : = 5 | |
| | | | | 220 | "no" ( field 110-5 empty ) | |

TABLE 1-continued

Method 200 for example (A)

| (1) | (2) | (3) | (4) | (5) | (6) | (7) |
|---|---|---|---|---|---|---|
| pointers | | | | FIGS. | steps in | reference to FIGS. |
| V | V' | V" | R | 5A–C | explanation to (5) | 2 and 6 |
| | | | | 230 | "no" ( V = R ) | |
| | | | | 220' | "no" ( field 110-3 empty ) | |
| | 4 | | | 230';235' | "yes" ( V' < R ); V' : = 4 | |
| | | | | 220' | "yes" ( field 110'-4 with ④ ⑤ ) | |
| | | | | 225';270' | "yes"; transmit C (4,1) | 709 |
| | | | | 280';285' | ④ to 110'-1 (TS (1) ); N : = 1 | line 317 to ④ 318 |
| | | | | 220' | "yes" ( field 110'-4 with ⑤ ) | |
| | | | | 225';270' | "yes"; transmit C (5,1) | 710 |
| | | | | 280';285' | ⑤ to 110'-1 (TS (1) ); N : = 1 | line 319 to • ⑤ 320 |
| 5 | 4 | 3 | 6 | 250;215 | R : = 6; N : = 2 | |
| | | | | 220 | "no" ( field 110-5 empty) | |
| 6 | | | | 230;235 | "yes" ( V < R ); V : = 6 | |
| | | | | 220 | "yes" ( field 110-6 with ① ② ③ ) | |
| | | | | 225;270 | "yes"; transmit C (3,2) | 711 |
| | | | | 280;285 | ③ to 110-3; N : = 1 | line 321 to • ③ 322 |
| | | | | 220 | "yes" ( field 110-6 with ① ② ) | |
| | | | | 225;270 | "yes"; transmit C (1,3) | 712 |
| | | | | 280;285 | ① to 110-8; N : = 0 | line 323 to ① 324 |
| 6 | 4 | 3 | 7 | 250;215 | R : = 7; N : = 2 | |
| | | | | 220 | "yes" ( field 110-6 with ② ) | |
| | | | | 225;270 | "yes"; transmit C (2,3) | 713 |
| | | | | 280,285 | ② to 110-1 (TS (1) ); N : = 1 | line 325 to ② 326 |
| | | | | 220 | "no" ( field 110-6 empty ) | |
| 7 | | | | 230;235 | "yes" ( V < R ); V : = 7 | |
| | | | | 220 | "no" (field 110-7 empty) | |
| | | | | 230 | "no" ( V = R ) | |
| | | | | 220' | "no" ( field 110'-4 empty ) | |
| | 5 | | | 230';235' | "yes" ( V' < R ); V' : = 5 | |
| | | | | 220' | "no" ( field 110'-5 empty ) | |
| | 6 | | | 230';235' | "yes" ( V' < R ); V' : = 6 | |
| | | | | 220' | "no" ( field 110'-6 empty ) | |
| | 7 | | | 230';235' | "yes" ( V' < R ); V' : = 7 | |
| | | | | 220' | "no" ( field 110'-7 empty ) | |
| | | | | 230' | "no" ( V' = R ) | |
| | | | | 220" | "yes" ( field 110"-4 with ⑥ ) | |
| | | | | 225";270" | "yes"; transmit C (6,1) | 714 |
| | | | | 280";285" | ⑥ to 110"-3; N : = 0   line 327 | to ⑥ 328 |

(m)

During time slot TS (1), processor 150 consecutively searches in fields 110-1. 110'-1, and 110"-1 (all priorities) for channel identifiers "s". However, an identifier is not found, and $N_{slot}$=2 idle cells C (idle) are sent (step 240).

During time slot TS (2), processor 150 once and identifies channels CH (1) and CH (2) by ① and ②, respectively, in field 110-2 and transmits in total $N_{slot}$=2 data cells from these channels. Virtual pointer V (high priority) is advanced to the real pointer R, while virtual pointers V' and V" stay unchanged. Processor 150 reschedules the next transmission from CH (1) and CH (2) for time slot TS (4) which is one period P apart from time slot TS (2).

During time slot TS (3), processor 150 finds ③ in high priority field 110-3 and transmits (step 270) cell C (3,1) from channel CH (3). After having moved ③ to field 110-6 (step 280), processor 150 again looks up in field 110-3. But field 110-3 as well as fields 110-1, 110-2, 110-3 (medium priority) and fields 110"-1, 110"-2 and 110"-3 are empty and processor 150 finishes this cycle (cf. step 250) by sending an idle cell C (idle) (step 240). All virtual pointer V, V', and V" have advanced to the real pointer R.

During time slot TS (4), processor 150 operates similar as during time slot TS (2) by sending data cells from high priority channels CH (1) and CH (2).

During time slot TS (5), processor 150 finds channel identifiers ④ and ⑤ for medium priority channels and sends 2 data cells. Virtual pointers V and V' are advanced. Since processor does not enters the low priority loop (double primed steps), virtual pointer V" remains unchanged.

During time slot TS (6), processor 150 finds ① ② and ③ identifiers in field 110-6 and 2 data cells are transmitted. Identifiers ① and ③ are shifted to another position while ② remains in field 110-6.

During time slot TS (7), processor 150 finds ② in field 110-6 and transmits a data cell from high priority CH (2). Then, processor 150 checks field 110-7 (same high priority) which is empty. While advancing virtual pointer V', processor 150 looks up in medium priority fields 110'-4 to 110'-7 which are also empty. Finally, processor 150 finds ⑥ in low priority field 110"-4 and serves channel CH (6).

(n)

Table 2 illustrates virtual pointer V for high priority in column (1), virtual pointer V' for medium priority in column (2), sustain pointer U (3) for low priority VBR-channel CH (3) in column (3), real pointer R in column (4), method steps of FIGS. 5A–C and FIG. 8–10 in column (5), short explanations in column (6), and events 7xx from FIG. 3 and channel identifier and lines 4xx from FIG. 7 in columns (7). A summary at the end of table 2 explains the most important steps for each time slot TS (R).

TABLE 2

Method 200 for example (B)

| (1) | (2) | (3) | (4) | (5) steps | | (7) reference to FIGS. |
|---|---|---|---|---|---|---|
| pointers | | | | 5A–C, | | |
| V | V' | U(3) | R | 8–10 | explanation for (5) | 3, 7 |
| | | | | 211 | schedule CH (1), CH (2) for TS (1) and CH (3) for TS (2) | ① 401, ② 402, ③ 403 |
| 1 | 1 | 1 | 1 | 213;215 | R : = 1; V : = 1; V' : = 1, U (3) : = 1; N : = 2 | |
| | | | | 220 | "yes" ( field 110-1 with ① ② ) | |
| | | | | 225; 270 | "yes" transmit C (1,1) | 801 |
| | | | | 280; 285 | ① to field 110-2 (TS (2) ); N : = 1 | line 404 ① to 405 |
| | | | | 220 | "yes" field 110-1 with ② | |
| | | | | 225; 270 | "yes" , transmit C (2,1) | 802 |
| | | | | 280; 285 | ② to field 110-2 (TS (2) ); N : = 0 | line 406 to ② 407 |
| 1 | 1 | 1 | 2 | 250; 215 | R : = 2; N : = 2 | |
| | | | | 220 | "no" field 110-1 empty | |
| 2 | | | | 230; 235 | "yes" ( V < R ); V : = 2 | |
| | | | | 220 | "yes" ( field 110-2 with ① ② ) | |
| | | | | 225; 270 | "yes" transmit C (1,2) | 803 |

TABLE 2-continued

Method 200 for example (B)

| (1) V | (2) V' | (3) U(3) | (4) R | (5) steps pointers 5A–C, 8–10 | explanation for (5) | (7) reference to FIGS. 3, 7 |
|---|---|---|---|---|---|---|
| | | | | 280; 285 | ① to field 110-3 (TS (3) ); N := 1 | line 408 to ① 409 |
| | | | | 220 | "yes" ( field 110-2 with ② ) | |
| | | | | 225; 270 | "yes" ; transmit C (2,2) | 804 |
| | | | | 280; 285 | ② to field 110-3 (TS (3) ); N := 0 | line 410 to ② 411 |
| 2 | 1 | 1 | 3 | 250; 215 | R := 3; N := 2 | |
| | | | | 220 | "no" ( field 110-2 empty ) | |
| 3 | | | | 230; 235 | "yes" ( V < R ); V := 3 | |
| | | | | 220 | "yes" ( field 110-3 with ① ② ) | |
| | | | | 225; 270 | "yes" ; transmit C (1,3) | 805 |
| | | | | 280; 285 | ① to field 110-4 (TS (4) ); N := 1 | line 412 to ① 413 |
| | | | | 220 | "yes" field 110-3 with ② | |
| | | | | 225; 270 | "yes" ; transmit C (2,3) | 806 |
| | | | | 280,285 | ② to field 110-4 (TS (4) ); N := 0 | line 414 to ② 415 |
| 3 | 1 | 1 | 4 | 250; 215 | R := 4; N := 2 | |
| | | | | 220 | "no" ( field 110-3 empty ) | |
| 4 | | | | 230; 235 | "yes" ( V <R ); V := 4 | |
| | | | | 220 | "yes" ( field 110-4 with ① ② ) | |
| | | | | 225; 270 | "yes" ; transmit C (1,4) | 807 |
| | | | | 280; 285 | ① to field 110-5 (TS (5) ); N := 1 | line 416 to ① 417 |
| | | | | 220 | "yes" ( field 110-4 with ② ) | |
| | | | | 225; 270 | "yes" ; transmit C (2,4) | 808 |
| | | | | 280; 285 | ② to field 110-5 (TS (5) ); N := 0 | line 418 to ② 419 |
| 4 | 1 | 1 | 5 | 250; 215 | R := 5; N := 2 | |
| | | | | 220 | "no" ( field 110-4 empty ) | |
| 5 | | | | 230; 235 | "yes" ( V < R ); V := 5 | |
| | | | | 220 | "yes" ( field 110-5 with ① ② ) | |
| | | | | 225; 270 | "yes" ; transmit C (1,5) | 809 |
| | | | | 280; 285 | ① to field 110-6 (TS (6) ); N := 1 | line 420 to ① 421 |
| | | | | 220 | "yes" ( field 110-5 with ② ) | |
| | | | | 225 | "no" (channel CH (2) silent) | |
| | | | | 275 | ② to field 110-8 (TS (8) ) | line 422 to ② 423 |
| | | | | 220 | "no" ( field 110-5 empty ) | |
| | | | | 230 | "no" ( V = R ) | |
| | | | | 220' | "no" ( field 110'-1 empty ) | |
| | 2 | | | 230'; 235' | "yes" ( V < R ); V' := 2 | |
| | | | | 220' | "yes" ( field 110'-2 with ③ ) | |
| | | | | 225'; 270' | "yes" ; transmit C (1,3) | 810 |
| | | | | 280' | ③ to field 110'-6 TS (6) (substeps • below) | line 424 to ③ 425 |
| | | | | • 510 | • "yes"( (R-U (s) ) >P (3) ) | |
| | | | | • 520 | • $P_R := P_B(3)$ ($P_R := 1$) | |
| | | 3 | | • 525 | • U (3) := 3 | |
| | | | | • 540 | • "no" | |
| | | | | • 600 | • | |
| | | | | 285' | N := 0 | |
| 5 | 2 | 3 | 6 | 250; 215 | R := 6; N := 2 | |
| | | | | 220 | "no" ( field 110-5 empty ) | |
| 6 | | | | 230; 235 | "yes" ( V < R ); V := 6 | |
| | | | | 220 | "yes" ( field 110-6 with ① ) | |
| | | | | 225 | "no" ( channel CH (1) silent ) | |
| | | | | 275 | ① to field 110-8 (TS (8) ) | line 426 to ① 427 |
| | | | | 220 | "no" ( field 110-6 empty ) | |
| | | | | 230 | "no" ( V = R ) | |
| | | | | 220' | "no" ( field 110'-2 empty ) | |
| | 3 | | | 230'; 235' | "yes" ( V' < R ); V' := 3 | |
| | | | | 220' | "no" ( field 110'-3 empty ) | |
| | 4 | | | 230'; 235' | "yes" ( V' < R ); V' := 4 | |
| | | | | 220' | "no" ( field 110'-4 empty ) | |
| | 5 | | | 230'; 235' | "yes" ( V' < R ); V' := 5 | |
| | | | | 220' | "no" (field 110'-5 empty ) | |
| | 6 | | | 230'; 235' | "yes" ( V' < R ); V' := 6 | |
| | | | | 220' | "yes" ( field 110'-6 with ③ ) | |
| | | | | 225'; 270' | "yes" ; transmit C (3,2) | 811 |
| | | | | 280' | ③ to field 110'-7 (TS (7) ) substeps • below | line 428 to ③ 429 |
| | | | | • 510 | • "yes" ((R -U (s) )>P (3) ) | |
| | | | | • 520 | • $P_R := P_B(3)$ | |
| | | | | • 525 | • U (3) := 5 | |
| | | | | • 540 | • "no" | |
| | | | | • 600 | • | |
| | | | | 285' | N := 1 | |
| | | | | 220' | "no" ( field 110-6 empty ) | |
| | | | | 230' | "no" ( V' = R ) | |
| | | | | 240 | send C (idle) | 812 |
| 6 | 6 | 5 | 7 | 250; 215 | R := 7; N := 2 | |
| | | | | 220 | "no" ( field 110-6 empty ) | |
| 7 | | | | 230; 235 | "yes" ( V < R ); V := 7 | |
| | | | | 220 | "no" ( field 110-7 empty ) | |
| | | | | 230 | "no" ( V = R ) | |
| | | | | 220' | "no" ( field 110'-6 empty ) | |
| | 7 | | | 230'; 235' | "yes" ; ( V' < R ); V' := 7 | |
| | | | | 220' | "yes" (field 110'-7 with ③ ) | |
| | | | | 225'; 270' | "yes" ; transmit C (3,3) | 813 |
| | | | | 280' | ③ to field 110-8' (TS (8) ) (substeps • below) | line 430 to ③ 431 |
| | | | | • 510 | • "no" R - U (s) = P (3) | |
| | | | | • 530 | • $P_R : P (s)$ | |
| | | 7 | | • 525 | • U (3) := 7 | |
| | | | | • 540 | • "no" | |
| | | | | • 600 | • | |
| | | | | 285' | N := 1 | |
| | | | | 220' | "no" ( field 110'-7 empty ) | |
| | | | | 230' | "no" ( V' = R ) | |
| | | | | 240 | send C (idle) | 814 |
| 7 | 7 | 7 | 8 | 250; 215 | R := 8; N := 2 | |

(o)

High priority channels CH (1) supplies data cells C (1,q) during slots TS (1) to TS (5) which are transmitted. High priority channel CH (2) supplies data cells C (2,q) during time slots TS (1) to TS (4) which are also transmitted. When channel CH (2) becomes silent with TS (5), processor 150 serves low priority VBR-channel CH (3).

The present invention can also be described as a multiplexer (e.g., system 100) for forwarding data (e.g., data cells 102) from channels (e.g., CH (s) ) to a communication line (e.g., line 180) by time slots (e.g., TS (R) ). The multiplexer comprises a first plurality of schedule fields (e.g., fields 110-V and 110-R) with first fields storing channel identifiers for a current time slot (e.g., field 110-R) and for previous time slots (field 110-V) and second fields storing channel identifiers for future time slots (e.g., field 110-J); and a processor (e.g., processor 150) which during the current time slot (e.g., TS (R) as long as the communication line is able to receive data (e.g., N>0) (i) looks up for a first channel identifier (e.g., "s") in the first fields (e.g., in step 220), (ii) forwards data from that channel which is identified by the first channel identifier (e.g., in step 270), and (iii) moves the first channel identifier to one of the second fields (e.g., in step 280).

Thereby, a pointer R cyclically in time slots (advancing R) points to one of the first fields (e.g., to field 110-R), pointer V moving towards pointer R (e.g., steps 230 and 235) points during a single time slot (e.g., R unchanged) to one or more of the first fields and approaches pointer R, and the processor looks up in fields which are pointed to by pointer V (e.g., step 220). Preferably, the processor determines whether the communication line is able to receive data or not by changing a counter variable (e.g., N) everytime the processor forwards data (e.g., step 285). Conveniently, the counter variable is initiated at the beginning of each time slot (e.g., in step 215) to a value which corresponds to a data carrying capacity of the communication (e.g., $N_{slot}$) line during a single time slot. Preferably, the multiplexer sends default data (e.g., idle cells) to the communication line when the processor does not identify a channel identifier.

While the invention has been described in terms of particular structures, steps., and devices, those of skill in the art will understand based on the description herein that it is not limited merely to such examples and that the full scope of the invention is properly determined by the claims that follow.

What is claimed is:

1. In an apparatus continuously receiving cells from channels and periodically in one time slot transmitting a total number $N_{slot}$ of said cells to a communication line, a method for selecting cells comprising the steps of:
   (i) assigning a first pointer R and a second pointer V to schedule fields; and
   (ii) in a time slot identified by said first pointer R,
      (a) assigning a counter N to $N_{slot}$;
      (b) looking up in the schedule fields identified by said second pointer V for channel identifiers "s" and if "s" is found transmitting a cell from one channel identified by "s", moving said channel identifier "s" to a different schedule field identified by J, and changing said counter N, wherein channel identifiers are moved with the following substeps:
         reading a period P (s) of said channel from a parameter field;
         reading an entry L (s) from a link field identified by "s";
         writing said entry L (s) to first schedule field V;
         calculating J by: J:=$\mod_M$(V+P (s));
         reading a channel identifier from a first schedule field J;
         writing said channel identifier to said link field identified by "s"; and
         writing "s" to said first field J;
      (c) depending on said counter N, repeating said step (b) or changing said first pointer R and starting said step (ii) for a new time slot;
      (d) if said second pointer V and said first pointer R are different, changing said second pointer V and repeating said step (b).

2. In an apparatus continuously receiving cells from channels and periodically in one time slot transmitting a total number $N_{slot}$ of said cells to a communication line, a method for selecting cells comprising the steps of:
   (i) assigning a first pointer R and a second pointer V to schedule fields; and
   (ii) in a time slot identified by said first pointer R,
      (a) assigning a counter N to $N_{slot}$;
      (b) looking up in the schedule fields identified by said second pointer V for channel identifiers "s" and if "s" is found transmitting a cell from one channel identified by "s", moving said channel identifier "s" to a different schedule field identified by J, wherein said different first schedule field J is determined using a period P (s) of said channel;
      (c) depending on said counter N, repeating said step (b) or changing said first pointer R and starting said step (ii) for a new time slot;
      (d) if said second pointer V and said first pointer R are different changing said second pointer V and repeating said step (b).

3. In an apparatus continuously receiving cells from channels and periodically in one time slot transmitting a total number $N_{slot}$ of said cells to a communication line, a method for selecting cells comprising the steps of:
   (i) assigning a first pointer R and a second pointer V to schedule fields, and
   (ii) in a time slot identified by said first pointer R,
      (a) assigning a counter N to $N_{slot}$;
      (b) looking up in the schedule fields identified by said second pointer V for channel identifiers "s" and if "s" is found transmitting a cell from one channel identified by "s", moving said channel identifier "s" to a different schedule field identified by J, and changing said counter N;
      (c) depending on said counter N, repeating said step (b) or changing said first pointer R and starting said step (ii) for a new time slot;
      (d) if said second pointer V and said first pointer R are different, changing said second pointer V and repeating said step (b);

wherein some of said channels are variable bit rate channels (VBR-channel), each VBR-channel having a first period P (s), a second period $P_B$(s), and a third pointer U (s), and wherein in case of VBR-channels, in said moving step said different first schedule field J is determined by either (x) said first period P (s) when a first modulo difference between said first pointer R and said third pointer is larger than said first period P (s), or (y) otherwise by said second period $P_B$ (s).

4. The method of claim 3 comprising the further step of advancing said third pointer U (s) by said first period P (s).

5. The method of claim 3 comprising the further steps of advancing said third pointer U (s) by said first period P (s); and if said first modulo difference is larger than a burst tolerance BT (s) of said channel, adjusting said third pointer U (s) to a second modulo difference between said first pointer R and said burst tolerance BT (s).

6. A system comprising:

a processor performing a data transfer of data cells
   (i) from a first plurality of data inputs
   (ii) to at least one data output which accommodates a constant number of data cells during consecutive time slots;

a first table coupled to said processor for storing input identifiers to schedule said data transfer for a finite number of time slots, in said table a sub-table defined by a first pointer and a second pointer identifying data inputs for said data transfer; and a second table coupled to said processor for storing parameters of said data inputs; said processor cyclically
 (a) if data inputs are identified in said sub-table, performing data transfer and rescheduling the next data transfer from the identified input by said second table
 (b) changing said second pointer to modify said sub-table and repeating said step (a) until said first and second pointers are identical,
 (c) generating idle cells for filling up, and
 (d) modifying said first pointer and repeating steps (a), (b) and (c).

7. The system of claim 6 wherein said processor stores said first and second pointer in a program memory.

8. The system of claim 6 wherein said data output is a single communication line.

9. The system of claim 6 wherein consecutive time slots have substantially equal length.

10. The system of claim 6 wherein said parameters comprise periods of said inputs, said periods indicating the number of time slots by which data cells are available from said data inputs.

11. The system of claim 6 wherein said parameters comprise priority information and wherein said system comprises a further table.

12. A system comprising:

a channel memory providing cells from S channels CH (s);

a processor
 for storing a time slot pointer R and an auxiliary pointer V,
 for receiving cells from said channels CH (s) during or before time slots TS (R),
 for transmitting a constant number $N_{slot}$ of cells to a communication network during one of said time slots TS (R);

a first plurality of S first fields for storing a period P (s) for each of said S channel CH (s);

a second plurality of S second fields for storing link entries L (s) in some of said second fields;

a third plurality of M third fields for storing channel identifiers of said channels CH (s), said third fields, wherein during one time slot TS (R)
 said time slot pointer R points to one of said third fields and
 said auxiliary pointer V points to one or consecutively to more than one of said third fields;

during one time slot said processor
 (a) looking up in at least one of said third fields, and if channel identifiers are stored in that third field,
  (1) transmitting a number of $N_{slot}$ or less cells from channels identified by said channel identifiers to said communication network
  (2) rescheduling said channel CH (s) using said link field and said period
 (b) transmitting further cells if the number of transmitted cells in step (a) is less than said number $N_{slot}$.

13. The system of claim 12 wherein said cells are being either data cells from said channels CH (s) or idle cells C (idle) generated within said multiplexer, and wherein said number $N_{slot}$ a sum of a first number of data cells and a second number of idle cells.

14. The system of claim 12 wherein said time slot pointer R, said auxiliary pointer V are modulo counted to the base M.

15. The system of claim 12 wherein during one time slot said auxiliary pointer moves in the direction of said time slot pointer.

* * * * *